United States Patent
Wang et al.

(10) Patent No.: US 12,401,402 B2
(45) Date of Patent: Aug. 26, 2025

(54) COMMUNICATION METHOD, APPARATUS, CHIP, STORAGE MEDIUM, AND PROGRAM PRODUCT

(71) Applicant: Huawei Technologies Co., Ltd., Shenzhen (CN)

(72) Inventors: Bichai Wang, Beijing (CN); Hongli He, Beijing (CN); Xueru Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 18/265,043

(22) PCT Filed: Dec. 2, 2021

(86) PCT No.: PCT/CN2021/135131
§ 371 (c)(1),
(2) Date: Jun. 2, 2023

(87) PCT Pub. No.: WO2022/117046
PCT Pub. Date: Jun. 9, 2022

(65) Prior Publication Data
US 2024/0022306 A1    Jan. 18, 2024

(30) Foreign Application Priority Data

Dec. 4, 2020  (CN) .................... 202011407395.9
Dec. 31, 2020 (CN) .................... 202011627413.4

(51) Int. Cl.
*H04B 7/02* (2018.01)
*H04B 7/06* (2006.01)

(52) U.S. Cl.
CPC ......... *H04B 7/0634* (2013.01); *H04B 7/0639* (2013.01)

(58) Field of Classification Search
CPC ........................... H04B 7/0634; H04B 7/0639
USPC ............... 375/267, 260, 259, 219, 295, 316
See application file for complete search history.

(56) References Cited

U.S. PATENT DOCUMENTS

| | | | |
|---|---|---|---|
| 10,601,485 B2 | 3/2020 | Park et al. | |
| 2016/0020846 A1* | 1/2016 | Wang | H04B 7/0456 370/329 |
| 2020/0274604 A1 | 8/2020 | Sun et al. | |
| 2022/0287059 A1* | 9/2022 | Huang | H04B 7/0456 |

* cited by examiner

*Primary Examiner* — Zewdu A Kassa
(74) *Attorney, Agent, or Firm* — Slater Matsil, LLP

(57) ABSTRACT

In accordance with an embodiment, a communication method includes: sending, by a first device, a first reference signal of M (M>2) ports; and receiving, by the first device, first indication information that indicates a first precoding matrix in a target codebook. The first precoding matrix is associated with the first reference signal, and the target codebook includes at least one target precoding matrix that is a partially coherent precoding matrix or a coherent precoding matrix.

20 Claims, 8 Drawing Sheets

COMMUNICATION METHOD, APPARATUS, CHIP, STORAGE MEDIUM, AND PROGRAM PRODUCT

CROSS-REFERENCE TO RELATED APPLICATIONS

This application is a National Stage of International Application No. PCT/CN2021/135131, filed on Dec. 2, 2021, which claims priority to Chinese Patent Application No. 202011627413.4, filed on Dec. 31, 2020 and Chinese Patent Application No. 202011407395.9, filed on Dec. 4, 2020. All of the aforementioned applications are hereby incorporated by reference in their entireties.

TECHNICAL FIELD

This application relates to the field of communication technologies, and in particular, to a communication method, an apparatus, a chip, a storage medium, and a program product.

BACKGROUND

With diversification of services such as the mobile Internet and the Internet of Things, mobile communication has increasingly high requirements for uploading massive data, which imposes a relatively high requirement for an uplink capacity. The uplink capacity may be increased by using an uplink enhancement solution of transmit channel resource pooling. However, an existing protocol supports only 2-port and 4-port codebooks, and in a 4-port codebook, only incoherent precoding is supported when only two ports are activated for layer 2 precoding. This limits flexibility in precoding after transmit channel switching, cannot meet a requirement for transmit channel resource pooling, and may affect performance. In addition, after the transmit channel resources are pooled, a configuration of available transmit channels for three ports may be needed, and an indication method based on a transmitted precoding matrix indicator (TPMI) for 2-port and 4-port codebooks is not suitable for the uplink enhancement solution of transmit channel resource pooling.

To increase the uplink capacity by using transmit channel resource pooling and implement flexible and accurate physical uplink shared channel (PUSCH) scheduling, the uplink precoding codebook and TPMI-based indication method need to be enhanced.

SUMMARY

In view of this, a communication method, an apparatus, a chip, a storage medium, and a program product are proposed.

According to a first aspect, an embodiment of this application provides a communication method. The method includes: a first device sends a first reference signal of M ports, where M is an integer greater than 2; and the first device receives first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to the first aspect, in a first possible implementation of the first aspect, the partially coherent precoding matrix is a precoding matrix in which one column includes more than one and less than M non-zero elements, and the coherent precoding matrix is a precoding matrix in which all columns include M non-zero elements.

Based on the foregoing technical solution, the partially coherent precoding matrix included in the target codebook is a precoding matrix in which one column includes more than one and less than M non-zero elements, and the included coherent precoding matrix is a precoding matrix in which all columns include M non-zero elements.

According to the first aspect, in a second possible implementation of the first aspect, the first indication information includes indication information of a first TPMI, and the first TPMI is an index of the first precoding matrix in the target codebook.

Based on the foregoing technical solution, the first indication information includes the indication information of the first TPMI, so that the first TPMI is used to indicate the index of the first precoding matrix in the target codebook of the M ports.

According to the first aspect, in a third possible implementation of the first aspect, when only two rows in the target precoding matrix include non-zero elements, the two rows in the target precoding matrix that include the non-zero elements are determined by [a, b; c, d], and a, b, c, and d are elements in $\{1/A_1, -1/A_1, j/A_1, -j/A_1\}$, where j is an imaginary unit, and $A_1$ is a positive constant.

Based on the foregoing technical solution, $\{1/A_1, -1/A_1, j/A_1, -j/A_1\}$ is used to determine that the target codebook of the M ports includes only two rows of non-zero elements, so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the first aspect, in a fourth possible implementation of the first aspect, the two rows in the target precoding matrix that include non-zero elements each may have any row location in the target precoding matrix, and a matrix formed by the two rows in the target precoding matrix that include non-zero elements is [a, b; c, d].

Based on the foregoing technical solution, the target precoding matrix that is included in the target codebook of the M ports and that includes only two rows of non-zero elements is determined by [a, b; c, d], so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the first aspect, in a fifth possible implementation of the first aspect, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, $A_2$ is a positive constant, and the three rows in the target precoding matrix that include the non-zero elements each may have any row location.

Based on the foregoing technical solution, $\{1/A_2, e^{j\pi/3}/A_2, e^{j2\pi/3}/A_2, -1/A_2, -e^{j2\pi/3}/A_2, -e^{j\pi/3}/A_2\}$ is used to determine the non-zero elements that are included in the only three rows in the target codebook of the M ports, so that the target codebook of the M ports includes a 3-port codebook of any 3-port combination, and uplink transmission on three transmit channels on a same carrier can be supported, thereby ensuring a degree of freedom of uplink transmit channel resource pooling, and improving uplink transmission performance.

According to the first aspect, in a sixth possible implementation of the first aspect, when only K rows in the target precoding matrix include non-zero elements, the non-zero elements are elements in $\{e^{jk\pi/K}/A_3\}$, where k=0, 1, 2, . . . , K−1, j is an imaginary unit, $A_3$ is a positive constant, and the K rows in the target precoding matrix that include the non-zero elements each may have any row location.

Based on the foregoing technical solution, $\{e^{jk\pi/K}/A_3\}$ is used to determine the non-zero elements that are included in the only K (M>K≥4) rows in the target codebook of the M ports, so that the target codebook of the M ports includes a K-port codebook of any K-port combination, and uplink transmission on K transmit channels on a same carrier can be supported, thereby ensuring a degree of freedom of uplink transmit channel resource pooling, and improving uplink transmission performance.

With reference to the first aspect or the foregoing possible implementations of the first aspect, in a seventh possible implementation of the first aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the first aspect or the foregoing possible implementations of the first aspect, in an eighth possible implementation of the first aspect, a waveform to which the target precoding matrix is applicable includes a discrete Fourier transformation spread orthogonal frequency division multiplexing (DFT-s-OFDM) waveform or a cyclic prefix orthogonal frequency division multiplexing (CP-OFDM) waveform.

Based on the foregoing technical solution, a waveform to which the target precoding matrix is applicable may be a DFT-s-OFDM waveform or a CP-OFDM waveform, to meet different requirements.

Based on the foregoing technical solution, a waveform to which the target precoding matrix is applicable may be a DFT-s-OFDM waveform or a CP-OFDM waveform, to meet different requirements.

According to a second aspect, an embodiment of this application provides a communication method, where the method includes: a second device receives a first reference signal of M ports, where M is an integer greater than 2; and the second device sends first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to the second aspect, in a first possible implementation of the second aspect, the partially coherent precoding matrix is a precoding matrix in which one column includes more than one and less than M non-zero elements, and the coherent precoding matrix is a precoding matrix in which all columns include M non-zero elements.

Based on the foregoing technical solution, the partially coherent precoding matrix included in the target codebook is a precoding matrix in which one column includes more than one and less than M non-zero elements, and the included coherent precoding matrix is a precoding matrix in which all columns include M non-zero elements.

According to the second aspect, in a second possible implementation of the second aspect, the first indication information includes indication information of a first TPMI, and the first TPMI is an index of the first precoding matrix in the target codebook.

Based on the foregoing technical solution, the first indication information includes the indication information of the first TPMI, so that the first TPMI is used to indicate the index of the first precoding matrix in the target codebook of the M ports.

According to the second aspect, in a third possible implementation of the second aspect, when only two rows in the target precoding matrix include non-zero elements, the two rows in the target precoding matrix that include the non-zero elements are determined by [a, b; c, d], where a, b, c, and d are elements in $\{1/A_1, -1/A_1, j/A_1, -j/A_1\}$, j is an imaginary unit, and $A_1$ is a positive constant.

Based on the foregoing technical solution, $\{1/A_1, -1/A_1, j/A_1, -j/A_1\}$ is used to determine that the target codebook of the M ports includes only two rows of non-zero elements, so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the third possible implementation of the second aspect, in a fourth possible implementation of the second aspect, the two rows in the target precoding matrix that include non-zero elements each have any row location in the target precoding matrix, and a matrix formed by the two rows in the target precoding matrix that include non-zero elements is [a, b; c, d].

Based on the foregoing technical solution, the target precoding matrix that is included in the target codebook of the M ports and that includes only two rows of non-zero elements is determined by [a, b; c, d], so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the second aspect, in a fifth possible implementation of the second aspect, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, $A_2$ is a positive constant, and the three rows in the target precoding matrix that include the non-zero elements each may have any row location.

Based on the foregoing technical solution, $\{1/A_2, e^{j\pi/3}/A_2, e^{j2\pi/3}/A_2, -1/A_2, -e^{j2\pi/3}/A_2, -e^{j\pi/3}/A_2\}$ is used to determine the non-zero elements that are included in the only three rows in the target codebook of the M ports, so that the target codebook of the M ports includes a 3-port codebook of any 3-port combination, and uplink transmission on three transmit channels on a same carrier can be supported, thereby ensuring a degree of freedom of uplink transmit channel resource pooling, and improving uplink transmission performance.

According to the second aspect, in a sixth possible implementation of the second aspect, when only K rows in the target precoding matrix include non-zero elements, the non-zero elements are elements in $\{e^{jk\pi/K}/A_3\}$, where k=0, 1, 2, ..., K−1, j is an imaginary unit, $A_3$ is a positive constant, and the K rows in the target precoding matrix that include the non-zero elements each may have any row location.

Based on the foregoing technical solution, $\{e^{jk\pi/K}/A_3\}$ is used to determine the non-zero elements that are included in the only K (M>K≥4) rows in the target codebook of the M ports, so that the target codebook of the M ports includes a K-port codebook of any K-port combination, and uplink transmission on K transmit channels on a same carrier can be supported, thereby ensuring a degree of freedom of uplink transmit channel resource pooling, and improving uplink transmission performance.

With reference to the second aspect or the foregoing possible implementations of the second aspect, in a seventh possible implementation of the second aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the second aspect or the foregoing possible implementations of the second aspect, in an eighth possible implementation of the second aspect, a waveform to which the target precoding matrix is applicable includes a DFT-s-OFDM waveform or a CP-OFDM waveform.

Based on the foregoing technical solution, a waveform to which the target precoding matrix is applicable may be a DFT-s-OFDM waveform or a CP-OFDM waveform, to meet different requirements.

According to a third aspect, an embodiment of this application provides a communication method, where the method includes: a first device sends a first reference signal of M ports, where M is an integer greater than 2; and the first device receives second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

Based on the foregoing technical solution, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

According to the third aspect, in a first possible implementation of the third aspect, the target codebook includes at least one target precoding matrix, a quantity of rows in the target precoding matrix is N, and the target precoding matrix does not include a row in which all elements are 0.

Based on the foregoing technical solution, in a codebook corresponding to a quantity N of antenna ports used by the first device to send data, the target precoding matrix does not include a row in which all elements are 0, so that uplink transmission on the N transmit channels can be supported, thereby ensuring a maximum degree of freedom of uplink transmit channel resource pooling, and improving uplink transmission performance.

According to the third aspect, in a second possible implementation of the third aspect, the second indication information includes indication information of a second TPMI, and the second TPMI is an index of the second precoding matrix in the target codebook.

Based on the foregoing technical solution, the second indication information includes the indication information of the second TPMI, so that the second TPMI is used to indicate the index of the second precoding matrix in the target codebook of the N ports.

According to the third aspect, in a third possible implementation of the third aspect, the elements included in the target precoding matrix are elements in $\{e^{jn\pi/N}/A\}$, where n=0, 1, 2, ..., N−1, j is an imaginary unit, and A is a positive constant.

Based on the foregoing technical solution, $\{e^{jn\pi/N}/A\}$ determines the target precoding matrix in the target codebook of the N ports, so that the target codebook of the N ports includes any N-port combination, and uplink transmission on the N transmit channels on a same carrier can be supported, thereby ensuring a degree of freedom of uplink transmit channel resource pooling, and improving uplink transmission performance.

According to the third aspect, in a fourth possible implementation of the third aspect, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port of the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

Based on the foregoing technical solution, "antenna port selection" may be indicated by using a port bitmap or a port indication vector.

With reference to the third aspect or the foregoing possible implementations of the third aspect, in a fifth possible implementation of the third aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the third aspect or the foregoing possible implementations of the third aspect, in a sixth possible implementation of the third aspect, a waveform to which the target precoding matrix is applicable includes a DFT-s-OFDM waveform or a CP-OFDM waveform.

Based on the foregoing technical solution, a waveform to which the target precoding matrix is applicable may be a DFT-s-OFDM waveform or a CP-OFDM waveform, to meet different requirements.

According to a fourth aspect, an embodiment of this application provides a communication method. The method includes: a second device receives a first reference signal of M ports, where M is an integer greater than 2; and the second device sends second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

Based on the foregoing technical solution, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

According to the fourth aspect, in a first possible implementation of the fourth aspect, the target codebook includes at least one target precoding matrix, a quantity of rows in the target precoding matrix is N, and the target precoding matrix does not include a row in which all elements are 0.

Based on the foregoing technical solution, in a codebook corresponding to a quantity N of antenna ports used by the first device to send data, the target precoding matrix does not include a row in which all elements are 0, so that uplink transmission on the N transmit channels can be supported, thereby ensuring a maximum degree of freedom of uplink transmit channel resource pooling, and improving uplink transmission performance.

According to the fourth aspect, in a second possible implementation of the fourth aspect, the second indication information includes indication information of a second TPMI, and the second TPMI is an index of the second precoding matrix in the target codebook.

Based on the foregoing technical solution, the second indication information includes the indication information of the second TPMI, so that the second TPMI is used to indicate the index of the second precoding matrix in the target codebook of the N ports.

According to the fourth aspect, in a third possible implementation of the fourth aspect, the elements included in the target precoding matrix are elements in $\{e^{jn\pi/N}/A\}$, where $n=0, 1, 2, \ldots, N-1$, j is an imaginary unit, and A is a positive constant.

Based on the foregoing technical solution, $\{e^{jn\pi/N}/A\}$ determines the target precoding matrix in the target codebook of the N ports, so that the target codebook of the N ports includes any N-port combination, and uplink transmission on the N transmit channels on a same carrier can be supported, thereby ensuring a degree of freedom of uplink transmit channel resource pooling, and improving uplink transmission performance.

According to the fourth aspect, in a fourth possible implementation of the fourth aspect, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port of the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

Based on the foregoing technical solution, "antenna port selection" may be indicated by using a port bitmap or a port indication vector.

With reference to the fourth aspect or the foregoing possible implementations of the fourth aspect, in a fifth possible implementation of the fourth aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the fourth aspect or the foregoing possible implementations of the fourth aspect, in a sixth possible implementation of the fourth aspect, a waveform to which the target precoding matrix is applicable includes a DFT-s-OFDM waveform or a CP-OFDM waveform.

Based on the foregoing technical solution, a waveform to which the target precoding matrix is applicable may be a DFT-s-OFDM waveform or a CP-OFDM waveform, to meet different requirements.

According to a fifth aspect, an embodiment of this application provides a communication apparatus. The apparatus includes: a module configured to send a first reference signal of M ports, where M is an integer greater than 2; and a module configured to receive first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to the fifth aspect, in a first possible implementation of the fifth aspect, the partially coherent precoding matrix is a precoding matrix in which one column includes more than one and less than M non-zero elements, and the coherent precoding matrix is a precoding matrix in which all columns include M non-zero elements.

Based on the foregoing technical solution, the partially coherent precoding matrix included in the target codebook is a precoding matrix in which one column includes more than one and less than M non-zero elements, and the included coherent precoding matrix is a precoding matrix in which all columns include M non-zero elements.

According to the fifth aspect, in a second possible implementation of the fifth aspect, the first indication information includes indication information of a first TPMI, and the first TPMI is an index of the first precoding matrix in the target codebook.

Based on the foregoing technical solution, the first indication information includes the indication information of the first TPMI, so that the first TPMI is used to indicate the index of the first precoding matrix in the target codebook of the M ports.

According to the fifth aspect, in a third possible implementation of the fifth aspect, when only two rows in the target precoding matrix include non-zero elements, the two rows in the target precoding matrix that include the non-zero elements are determined by [a, b; c, d], and a, b, c, and d are elements in $\{1/A_1, -1/A_1, j/A_1, -j/A_1\}$, where j is an imaginary unit, and $A_1$ is a positive constant.

Based on the foregoing technical solution, $\{1/A_1, -1/A_1, j/A_1, -j/A_1\}$ is used to determine that the target codebook of the M ports includes only two rows of non-zero elements, so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the fifth aspect, in a fourth possible implementation of the fifth aspect, the two rows in the target precoding matrix that include non-zero elements each may have any row location in the target precoding matrix, and a matrix formed by the two rows in the target precoding matrix that include non-zero elements is [a, b; c, d].

Based on the foregoing technical solution, the target precoding matrix that is included in the target codebook of the M ports and that includes only two rows of non-zero elements is determined by [a, b; c, d], so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the fifth aspect, in a fifth possible implementation of the fifth aspect, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, $A_2$ is a positive constant, and the three rows in the target precoding matrix that include the non-zero elements each may have any row location.

Based on the foregoing technical solution, $\{1/A_2, e^{j\pi/3}/A_2, e^{j2\pi/3}/A_2, -1/A_2, -e^{j2\pi/3}/A_2, -e^{j\pi/3}/A_2\}$ is used to determine the non-zero elements that are included in the only three rows in the target codebook of the M ports, so that the target codebook of the M ports includes a 3-port codebook of any 3-port combination, and uplink transmission on three transmit channels on a same carrier can be supported, thereby ensuring a degree of freedom of uplink transmit channel resource pooling, and improving uplink transmission performance.

According to the fifth aspect, in a sixth possible implementation of the fifth aspect, when only K rows in the target precoding matrix include non-zero elements, the non-zero elements are elements in $\{e^{jk\pi/K}/A_3\}$, where k=0, 1, 2, ..., K−1, j is an imaginary unit, $A_3$ is a positive constant, and the K rows in the target precoding matrix that include the non-zero elements each may have any row location.

Based on the foregoing technical solution, $\{e^{jk\pi/K}/A_3\}$ is used to determine the non-zero elements that are included in the only K (M>K≥4) rows in the target codebook of the M ports, so that the target codebook of the M ports includes a K-port codebook of any K-port combination, and uplink transmission on K transmit channels on a same carrier can be supported, thereby ensuring a degree of freedom of uplink transmit channel resource pooling, and improving uplink transmission performance.

With reference to the fifth aspect or the foregoing possible implementations of the fifth aspect, in a seventh possible implementation of the fifth aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the fifth aspect or the foregoing possible implementations of the fifth aspect, in an eighth possible implementation of the fifth aspect, a waveform to which the target precoding matrix is applicable includes a DFT-s-OFDM waveform or a CP-OFDM waveform.

Based on the foregoing technical solution, a waveform to which the target precoding matrix is applicable may be a DFT-s-OFDM waveform or a CP-OFDM waveform, to meet different requirements.

According to a sixth aspect, an embodiment of this application provides a communication apparatus. The apparatus includes: a module configured to receive a first reference signal of M ports, where M is an integer greater than 2; and a module configured to send first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to the sixth aspect, in a first possible implementation of the sixth aspect, the partially coherent precoding matrix is a precoding matrix in which one column includes more than one and less than M non-zero elements, and the coherent precoding matrix is a precoding matrix in which all columns include M non-zero elements.

Based on the foregoing technical solution, the partially coherent precoding matrix included in the target codebook is a precoding matrix in which one column includes more than one and less than M non-zero elements, and the included coherent precoding matrix is a precoding matrix in which all columns include M non-zero elements.

According to the sixth aspect, in a second possible implementation of the sixth aspect, the first indication information includes indication information of a first TPMI, and the first TPMI is an index of the first precoding matrix in the target codebook.

Based on the foregoing technical solution, the first indication information includes the indication information of the first TPMI, so that the first TPMI is used to indicate the index of the first precoding matrix in the target codebook of the M ports.

According to the sixth aspect, in a third possible implementation of the sixth aspect, when only two rows in the target precoding matrix include non-zero elements, the two rows in the target precoding matrix that include the non-zero elements are determined by [a, b; c, d], where a, b, c, and d are elements in $\{1/A_1, -1/A_1, j/A_1, -j/A_1\}$, j is an imaginary unit, and $A_1$ is a positive constant.

Based on the foregoing technical solution, $\{1/A_1, -1/A_1, j/A_1, -j/A_1\}$ is used to determine that the target codebook of the M ports includes only two rows of non-zero elements, so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the third possible implementation of the sixth aspect, in a fourth possible implementation of the sixth aspect, the two rows in the target precoding matrix that include non-zero elements each may have any row location in the target precoding matrix, and a matrix formed by the two rows in the target precoding matrix that include non-zero elements is [a, b; c, d].

Based on the foregoing technical solution, the target precoding matrix that is included in the target codebook of the M ports and that includes only two rows of non-zero elements is determined by [a, b; c, d], so that the target codebook of the M ports includes a 2-port codebook of any 2-port combination, and uplink transmission on two transmit channels on a same carrier can be supported, thereby ensuring a degree of freedom of uplink transmit channel resource pooling, and improving uplink transmission performance.

According to the sixth aspect, in a fifth possible implementation of the sixth aspect, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, $A_2$ is a positive constant, and the three rows in the target precoding matrix that include the non-zero elements each may have any row location.

Based on the foregoing technical solution, $\{1/A_2, e^{j2\pi/3}/A_2, e^{j2\pi/3}/A_2, -1/A_2, -e^{j\pi/3}/A_2, -e^{j\pi/3}/A_2\}$ is used to determine the non-zero elements that are included in the only three rows in the target codebook of the M ports, so that the target codebook of the M ports includes a 3-port codebook of any 3-port combination, and uplink transmission on three transmit channels on a same carrier can be supported, thereby ensuring a degree of freedom of uplink transmit channel resource pooling, and improving uplink transmission performance.

According to the sixth aspect, in a sixth possible implementation of the sixth aspect, when only K rows in the target precoding matrix include non-zero elements, the non-zero elements are elements in $\{e^{jk\pi/K}/A_3\}$, where k=0, 1, 2, ..., K−1, j is an imaginary unit, $A_3$ is a positive constant, and the K rows in the target precoding matrix that include the non-zero elements each may have any row location.

Based on the foregoing technical solution, $\{e^{jk\pi/K}/A_3\}$ is used to determine the non-zero elements that are included in the only K (M>K≥4) rows in the target codebook of the M ports, so that the target codebook of the M ports includes a K-port codebook of any K-port combination, and uplink transmission on K transmit channels on a same carrier can be supported, thereby ensuring a degree of freedom of uplink transmit channel resource pooling, and improving uplink transmission performance.

With reference to the sixth aspect or the foregoing possible implementations of the sixth aspect, in a seventh possible implementation of the sixth aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the sixth aspect or the foregoing possible implementations of the sixth aspect, in an eighth possible implementation of the sixth aspect, a waveform to which the target precoding matrix is applicable includes DFT-s-OFDM or CP-OFDM.

Based on the foregoing technical solution, a waveform to which the target precoding matrix is applicable may be a DFT-s-OFDM waveform or a CP-OFDM waveform, to meet different requirements.

According to a seventh aspect, an embodiment of this application provides a communication apparatus. The apparatus includes: a module configured to send a first reference signal of M ports, where M is an integer greater than 2; and a module configured to receive second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

Based on the foregoing technical solution, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

According to the seventh aspect, in a first possible implementation of the seventh aspect, the target codebook includes at least one target precoding matrix, a quantity of rows in the target precoding matrix is N, and the target precoding matrix does not include a row in which all elements are 0.

Based on the foregoing technical solution, in a codebook corresponding to a quantity N of antenna ports used by the first device to send data, the target precoding matrix does not include a row in which all elements are 0, so that uplink transmission on the N transmit channels can be supported, thereby ensuring a maximum degree of freedom of uplink transmit channel resource pooling, and improving uplink transmission performance.

According to the seventh aspect, in a second possible implementation of the seventh aspect, the second indication information includes indication information of a second TPMI, and the second TPMI is an index of the second precoding matrix in the target codebook.

Based on the foregoing technical solution, the second indication information includes the indication information of the second TPMI, so that the second TPMI is used to indicate the index of the second precoding matrix in the target codebook of the N ports.

According to the seventh aspect, in a third possible implementation of the seventh aspect, the elements included in the target precoding matrix are elements in $\{e^{jn\pi/N}/A\}$, where n=0, 1, 2, . . . , N−1, j is an imaginary unit, and A is a positive constant.

Based on the foregoing technical solution, $\{e^{jn\pi/N}/A\}$ determines the target precoding matrix in the target codebook of the N ports, so that the target codebook of the N ports includes any N-port combination, and uplink transmission on the N transmit channels on a same carrier can be supported, thereby ensuring a degree of freedom of uplink transmit channel resource pooling, and improving uplink transmission performance.

According to the seventh aspect, in a fourth possible implementation of the seventh aspect, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port of the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

Based on the foregoing technical solution, "antenna port selection" may be indicated by using a port bitmap or a port indication vector.

With reference to the seventh aspect or the foregoing possible implementations of the seventh aspect, in a fifth possible implementation of the seventh aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the seventh aspect or the foregoing possible implementations of the seventh aspect, in a sixth possible implementation of the seventh aspect, a waveform to which the target precoding matrix is applicable includes DFT-s-OFDM or CP-OFDM.

Based on the foregoing technical solution, a waveform to which the target precoding matrix is applicable may be a DFT-s-OFDM waveform or a CP-OFDM waveform, to meet different requirements.

According to an eighth aspect, an embodiment of this application provides a communication apparatus, where the apparatus includes: a module configured to receive a first reference signal of M ports, where M is an integer greater than 2; and a module configured to send second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

Based on the foregoing technical solution, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

According to the eighth aspect, in a first possible implementation of the eighth aspect, the target codebook includes at least one target precoding matrix, a quantity of rows in the target precoding matrix is N, and the target precoding matrix does not include a row in which all elements are 0.

Based on the foregoing technical solution, in a codebook corresponding to a quantity N of antenna ports used by the first device to send data, the target precoding matrix does not include a row in which all elements are 0, so that uplink transmission on the N transmit channels can be supported, thereby ensuring a maximum degree of freedom of uplink transmit channel resource pooling, and improving uplink transmission performance.

According to the eighth aspect, in a second possible implementation of the eighth aspect, the second indication information includes indication information of a second TPMI, and the second TPMI is an index of the second precoding matrix in the target codebook.

Based on the foregoing technical solution, the second indication information includes the indication information of the second TPMI, so that the second TPMI is used to indicate the index of the second precoding matrix in the target codebook of the N ports.

According to the eighth aspect, in a third possible implementation of the eighth aspect, the elements included in the target precoding matrix are elements in $\{e^{jn\pi/N}/A\}$, where n=0, 1, 2, ..., N−1, j is an imaginary unit, and A is a positive constant.

Based on the foregoing technical solution, $\{e^{jn\pi/N}/A\}$ determines the target precoding matrix in the target codebook of the N ports, so that the target codebook of the N ports includes any N-port combination, and uplink transmission on the N transmit channels on a same carrier can be supported, thereby ensuring a degree of freedom of uplink transmit channel resource pooling, and improving uplink transmission performance.

According to the eighth aspect, in a fourth possible implementation of the eighth aspect, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port of the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

Based on the foregoing technical solution, "antenna port selection" may be indicated by using a port bitmap or a port indication vector.

According to the eighth aspect or the foregoing possible implementations of the eighth aspect, in a fifth possible implementation of the eighth aspect, when the quantity of columns in the target precoding matrix is greater than 1, any two columns in the target precoding matrix are orthogonal column vectors.

Based on the foregoing technical solution, in a target precoding matrix in which a quantity of columns included in a target codebook is greater than 1, any two columns in the target precoding matrix are orthogonal column vectors, so as to improve applicability of the target codebook.

According to the eighth aspect or the foregoing possible implementations of the eighth aspect, in a sixth possible implementation of the eighth aspect, a waveform to which the target precoding matrix is applicable includes a DFT-s-OFDM waveform or a CP-OFDM waveform.

Based on the foregoing technical solution, a waveform to which the target precoding matrix is applicable may be a DFT-s-OFDM waveform or a CP-OFDM waveform, to meet different requirements.

According to a ninth aspect, an embodiment of this application provides a communication apparatus, including: a processor, where the processor is configured to execute a computer program stored in a memory, so as to perform the communication method according to the first aspect or one or more of the possible implementations of the first aspect, or the communication method according to the second aspect or one or more of the possible implementations of the second aspect, or the communication method according to the third aspect or one or more of the possible implementations of the third aspect, or the communication method according to one or more of the fourth aspect or the possible implementations of the fourth aspect.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to a tenth aspect, an embodiment of this application provides a non-volatile computer-readable storage medium. The non-volatile computer-readable storage medium stores computer program instructions. When the computer program instructions are executed by a processor, the communication method according to the first aspect or one or more of a possible implementations of the first aspect, or the communication method according to the second aspect or one or more of the possible implementations of the second aspect, or the communication method according to the third aspect or one or more of the possible implementations of the third aspect, or the communication method according to one or more of the fourth aspect or the possible implementations of the fourth aspect is implemented.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to an eleventh aspect, an embodiment of this application provides a chip, including a processor. When the processor executes instructions, the processor performs the communication method according to the first aspect or one or more of the possible implementations of the first aspect, or performs the communication method according to the second aspect or one or more of the possible implementations of the second aspect, or performs the communication method according to the third aspect or one or more of the possible implementations of the third aspect, or performs the communication method according to the fourth aspect or one or more of the possible implementations of the fourth aspect.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

According to a twelfth aspect, an embodiment of this application provides a computer program product including instructions. When the computer program product runs on a computer, the computer is enabled to perform the communication method according to one or more of the first aspect or the possible implementations of the first aspect, or perform the communication method according to one or more of the second aspect or the possible implementations of the second aspect, or perform the communication method according to the third aspect or the possible implementations of the third aspect, or perform the communication method according to the fourth aspect or one or more of the possible implementations of the fourth aspect.

Based on the foregoing technical solution, for an uplink enhancement solution of transmit channel resource pooling of a terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling, and improving uplink transmission performance.

These aspects and other aspects of this application are more concise and more comprehensive in descriptions of the following embodiments.

BRIEF DESCRIPTION OF THE DRAWINGS

The accompanying drawings included in this specification and constituting a part of this specification and this specification jointly show example embodiments, features, and aspects of this application, and are intended to explain the principles of this application.

DETAILED DESCRIPTION OF ILLUSTRATIVE EMBODIMENTS

Figure 1:
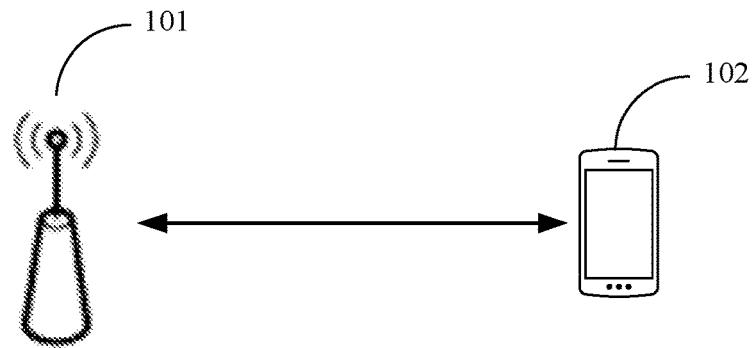
FIG. 1 is a schematic diagram of an architecture of a communication system to which a technical solution according to this application is applicable.

The following describes various example embodiments, features, and aspects of this application in detail with reference to the accompanying drawings. Identical reference signs in the accompanying drawings indicate elements that have same or similar functions. Although various aspects of embodiments are shown in the accompanying drawings, unless otherwise specified, the accompanying drawings do not need to be drawn to scale.

The specific term "example" herein means "used as an example, embodiment or illustration". Any embodiment described as an "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements and circuits that are well-known to a person skilled in the art are not described in detail, so that the subject matter of this application is highlighted.

With the diversified development of services such as mobile Internet and Internet of Things, mobile communication has increasingly higher requirements on uploading massive data. For example, services such as ultra-high definition video, intelligent surveillance, virtual reality (VR), augmented reality (AR), and live video have relatively high requirements on an uplink (UL) capacity. For example, currently, a sub-6G commercial frequency band of a mainstream 5th generation (5G) mobile communication system is mainly a medium- and high-frequency band such as 2.6 GHz, 3.5 GHz, or 4.9 GHz, and generally uses a time division duplex (TDD) mode. Consequently, problems such as a relatively high path loss and a relatively low uplink duty cycle occur, and the uplink capacity is insufficient.

The uplink capacity can be increased by using an uplink enhancement solution of transmit channel resource pooling. In this solution, transmit (Tx) channel resources of a terminal device are pooled, that is, transmit channels are allowed to be switched to different carriers, so that a quantity of transmit channels of each carrier may be flexibly adjusted based on an instantaneous channel condition, thereby improving resource utilization. For example, the terminal device has three transmit channels. In a non-transmit channel resource pooling mechanism, the three transmit channels work only on a specific frequency band. For example, the three transmit channels respectively work on frequency bands 2.6 GHz, 3.5 GHz, and 4.9 GHz. If the terminal device sends data that has a relatively high requirement for the uplink capacity, such as an ultra-high definition video, and a time-frequency resource of only one frequency band, for example, 2.6 GHz, is allocated, a transmit channel that works on another frequency band cannot work. Therefore, some transmit channel resources are wasted, and one 2.6 GHz frequency band may not meet a requirement, thereby imaging user experience. In this case, by using the transmit channel resource pooling solution, even if a time-frequency resource of only one frequency band, for example, 2.6 GHz, is allocated to the terminal device, the terminal device may send data on the allocated time-frequency resource by using another transmit channel. In other words, an ultra-HD video may be simultaneously sent by using frequency bands 2.6 GHz, 3.5 GHz, and 4.9 GHz, so that an additional antenna array gain, diversity gain, and multiplexing gain are provided by using an additional transmit channel resource, thereby increasing an uplink transmission rate, and improving user experience.

In the foregoing uplink enhancement solution of transmit channel resource pooling, the network device may obtain, by measuring a sounding reference signal (SRS), uplink channel information for switching transmit channels to different carriers. Then, the network device determines, based on the uplink channel information, an optimal transmit channel switching solution and a precoding scheme corresponding to the optimal transmit channel switching solution. The network device further schedules sending of the PUSCH by sending downlink control information (DCI).

The following first briefly describes some concepts in embodiments of this application.

1. Precoding technology: When a channel state is known, a sending device may process a to-be-sent signal by using a precoding matrix that matches the channel state, so that a precoded to-be-sent signal adapts to a channel, thereby reducing complexity of eliminating inter-channel impact by a receiving device. Therefore, the to-be-sent signal is processed by using the precoding matrix, so as to improve signal quality.

2. Precoding matrix: The precoding matrix may be determined based on a channel matrix of each frequency domain unit; and the channel matrix may be determined by a terminal device in a manner such as channel estimation or based on channel reciprocity. For example, the precoding matrix may be obtained by performing singular value decomposition (SVD) on a channel matrix or a covariance matrix of a channel matrix, or may be obtained by performing eigenvalue decomposition (EVD) on a covariance matrix of a channel matrix. The precoding matrix may fall into the following types: a fully coherent precoding matrix, a partially coherent precoding matrix, and an incoherent precoding matrix.

The fully coherent precoding matrix means that phase calibration and phase weighting can be completed between transmit antenna ports corresponding to different rows in the precoding matrix, that is, all transmit antenna ports of the terminal device may be used to send data of a same transmission layer.

The partially coherent precoding matrix means that phase calibration can be completed between transmit antenna ports corresponding to at least two rows in the precoding matrix, and phase weighting can be performed, and transmit antenna ports corresponding to the at least two rows may be used to send data at a same transmission layer. In addition, phase calibration cannot be completed between transmit antenna ports corresponding to at least two rows in the precoding matrix, and phase weighting cannot be performed, that is, transmit antenna ports corresponding to the at least two rows cannot be used to send data at a same transmission layer.

The incoherent precoding matrix means that phase calibration cannot be completed between transmit antenna ports corresponding to different rows in the precoding matrix, and phase weighting cannot be performed. In other words, transmit antenna ports corresponding to all rows cannot be used to send data of a same transmission layer, that is, one piece of transmission layer data can be sent only by using one of transmit antenna ports corresponding to all rows.

3. A quantity of precoding layers may also be referred to as a quantity of transmission layers. Optionally, the network device may determine, with reference to the rank of the channel matrix fed back by the terminal device, the quantity of precoding layers used for data transmission between the network device and the terminal device. The terminal device may determine the rank of the channel matrix based on a channel obtained through channel estimation. For example, in a process of determining the precoding matrix by using the SVD, different precoding layers may be distinguished according to the eigenvalue. For example, a precoding vector determined based on an eigenvector corresponding to a maximum eigenvalue may correspond to a first precoding layer, and a precoding vector determined based on an eigenvector corresponding to a minimum eigenvalue may correspond to a $Z^{th}$ precoding layer. That is, eigenvalues corresponding to the first transmission layer to the $Z^{th}$ precoding layer decrease in sequence.

4. A port may also be referred to as an antenna port, and may be understood as a virtual antenna identified by a receiving device. A port is a logical concept. One port may be one physical transmit antenna, or may be a combination of a plurality of physical transmit antennas. For signals that are sent through a same port, regardless of whether the signals are sent through a same physical antenna or different physical antennas, channels corresponding to paths through which the signals pass during spatial transmission may be considered as the same or correlated (for example, channel matrices with large-scale channel characteristic are the same). In other words, when demodulating signals that are sent through a same port, a receive end may consider that channels of the signals are the same or correlated, and the signal receive end usually identifies signals from different transmit channels by using antenna ports.

Optionally, the port may be a transmit antenna port. For example, a reference signal of each port may be a reference signal that is not precoded, or may be a precoded reference signal obtained by precoding a reference signal based on one delay vector. A quantity of ports may be a quantity of transmit antenna ports or a quantity of transmit antennas.

Optionally, the port is a reference signal port after beamforming. For example, a reference signal of each port may be a precoded reference signal obtained by precoding a reference signal based on one angle vector, or may be a precoded reference signal obtained by precoding a reference signal based on one angle vector and one delay vector. A quantity of ports may be a quantity of reference signal ports or a quantity of angle vectors. It may be understood that, a quantity of reference signal ports after beamforming may be less than a quantity of transmit antenna ports.

In embodiments shown below, unless otherwise specified, the port refers to a reference signal port, and the antenna port refers to a transmit antenna port.

5. A codebook, also referred to as a precoding codebook, is a predefined set of a limited quantity of precoding matrices. Optionally, the codebook may be a precoding matrix table that includes a plurality of precoding matrices and a TPMI index corresponding to each precoding matrix. The precoding matrix table is preconfigured by a network device and a terminal device, for example, stored in a storage medium or a chip of the network device or the terminal device before being delivered. A sending terminal may indicate, to a receiving terminal based on a codebook, a transmit antenna port and a corresponding precoding matrix that need to be collected for data transmission. For example, the network device indicates, to the terminal device based on a codebook, an antenna port for sending a PUSCH and a corresponding precoding matrix. In this case, the codebook may be referred to as an uplink precoding codebook.

Both the network device and the terminal device pre-store a plurality of codebooks for different quantities of antenna ports, different quantities of precoding layers, and different waveforms. For example, codebooks pre-stored between the network device and the terminal device may be shown in Table 1 to Table 7 below. In Table 1 to Table 7, W represents a precoding matrix. In each precoding matrix, each row corresponds to one transmit antenna port, and each column corresponds to one transmission layer. One TPMI index corresponds to one precoding matrix. In Table 1 to Table 7, the precoding matrices are arranged from left to right in ascending order of TPMI index values.

TABLE 1

Precoding matrix table for layer 1 transmission using two antenna ports

| TPMI index | W |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$  — — |

The codebook in Table 1 includes a precoding matrix for layer 1 transmission using two antenna ports. TPMI index values 0 and 1 correspond to incoherent precoding matrices, and index values 2 to 5 correspond to fully coherent precoding matrices.

TABLE 2

Precoding matrix table for layer 2 transmission using two antenna ports

| TPMI index | W |
|---|---|
| 0-2 | $\frac{1}{\sqrt{2}}\begin{bmatrix}1&0\\0&1\end{bmatrix}$  $\frac{1}{2}\begin{bmatrix}1&1\\1&-1\end{bmatrix}$  $\frac{1}{2}\begin{bmatrix}1&1\\j&-j\end{bmatrix}$  — |

The codebook in Table 2 includes a precoding matrix for layer 2 transmission using two antenna ports. TPMI index value 0 corresponds to an incoherent precoding matrix, and index values 1 and 2 correspond to fully coherent precoding matrices.

TABLE 3

Precoding matrix table for layer 1 transmission using four antenna ports and a DFT-s-OFDM waveform

| TPMI index | W |
|---|---|
| 0-7 | $\frac{1}{2}\begin{bmatrix}1\\0\\0\\0\end{bmatrix}$  $\frac{1}{2}\begin{bmatrix}0\\1\\0\\0\end{bmatrix}$  $\frac{1}{2}\begin{bmatrix}0\\0\\1\\0\end{bmatrix}$  $\frac{1}{2}\begin{bmatrix}0\\0\\0\\1\end{bmatrix}$  $\frac{1}{2}\begin{bmatrix}1\\0\\1\\0\end{bmatrix}$  $\frac{1}{2}\begin{bmatrix}1\\0\\-1\\0\end{bmatrix}$  $\frac{1}{2}\begin{bmatrix}1\\0\\j\\0\end{bmatrix}$  $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$  $\frac{1}{2}\begin{bmatrix}0\\1\\0\\-1\end{bmatrix}$  $\frac{1}{2}\begin{bmatrix}0\\1\\0\\j\end{bmatrix}$  $\frac{1}{2}\begin{bmatrix}0\\1\\0\\-j\end{bmatrix}$  $\frac{1}{2}\begin{bmatrix}1\\1\\1\\-1\end{bmatrix}$  $\frac{1}{2}\begin{bmatrix}1\\1\\j\\j\end{bmatrix}$  $\frac{1}{2}\begin{bmatrix}1\\1\\-1\\1\end{bmatrix}$  $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$  $\frac{1}{2}\begin{bmatrix}1\\j\\j\\1\end{bmatrix}$  $\frac{1}{2}\begin{bmatrix}1\\j\\-1\\-j\end{bmatrix}$  $\frac{1}{2}\begin{bmatrix}1\\j\\-j\\-1\end{bmatrix}$  $\frac{1}{2}\begin{bmatrix}1\\-1\\1\\-1\end{bmatrix}$  $\frac{1}{2}\begin{bmatrix}1\\-1\\j\\-j\end{bmatrix}$  $\frac{1}{2}\begin{bmatrix}1\\-1\\-1\\-1\end{bmatrix}$  $\frac{1}{2}\begin{bmatrix}1\\-1\\-j\\j\end{bmatrix}$ |

TABLE 3-continued

Precoding matrix table for layer 1 transmission using four antenna ports and a DFT-s-OFDM waveform

| TPMI index | W | | | | | | | |
|---|---|---|---|---|---|---|---|---|
| 24-27 | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ | — | — | — | — |

The codebook in Table 3 includes a precoding matrix for layer 1 transmission using four antenna ports and a discrete Fourier transformation spread orthogonal frequency division multiplexing (DFT-s-OFDM) waveform. TPMI index values 0 to 3 correspond to incoherent precoding matrices, index values 4 to 11 correspond to partially coherent precoding matrices, and index values 12 to 27 correspond to fully coherent precoding matrices.

TABLE 4

Precoding matrix table for layer 1 transmission using four antenna ports and a CP-OFDM waveform

| TPMI index | W | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\-j\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

The codebook in Table 4 includes a precoding matrix for layer 1 transmission using four antenna ports and a cyclic prefix orthogonal frequency division multiplexing (CP-OFDM) waveform. TPMI index values 0 to 3 correspond to incoherent precoding matrices, index values 4 to 11 correspond to partially coherent precoding matrices, and index values 12 to 27 correspond to fully coherent precoding matrices.

TABLE 5

Precoding matrix table for layer 2 transmission using four antenna ports and a CP-OFDM waveform

| TPMI index | W | | | |
|---|---|---|---|---|
| 0-3 | $\frac{1}{2}\begin{bmatrix}1&0\\0&1\\0&0\\0&0\end{bmatrix}$ | $\frac{1}{2}\begin{bmatrix}1&0\\0&0\\0&1\\0&0\end{bmatrix}$ | $\frac{1}{2}\begin{bmatrix}1&0\\0&0\\0&0\\0&1\end{bmatrix}$ | $\frac{1}{2}\begin{bmatrix}0&0\\1&0\\0&1\\0&0\end{bmatrix}$ |

TABLE 5-continued

Precoding matrix table for layer 2 transmission using four antenna ports and a CP-OFDM waveform

| TPMI index | W | | | |
|---|---|---|---|---|
| 4-7 | $\frac{1}{2}\begin{bmatrix}0&0\\1&0\\0&0\\0&1\end{bmatrix}$ | $\frac{1}{2}\begin{bmatrix}0&0\\0&0\\1&0\\0&1\end{bmatrix}$ | $\frac{1}{2}\begin{bmatrix}1&0\\0&1\\1&0\\0&-j\end{bmatrix}$ | $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ | $\frac{1}{2}\begin{bmatrix}1&0\\0&1\\-j&0\\0&-1\end{bmatrix}$ | $\frac{1}{2}\begin{bmatrix}1&0\\0&1\\-1&0\\0&-j\end{bmatrix}$ | $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ | $\frac{1}{2}\begin{bmatrix}1&0\\0&1\\j&0\\0&-1\end{bmatrix}$ | $\frac{1}{2\sqrt{2}}\begin{bmatrix}1&1\\1&1\\1&-1\\1&-1\end{bmatrix}$ | $\frac{1}{2\sqrt{2}}\begin{bmatrix}1&1\\1&1\\j&-j\\j&-j\end{bmatrix}$ |

TABLE 5-continued

Precoding matrix table for layer 2 transmission using four antenna ports and a CP-OFDM waveform

| TPMI index | W |
|---|---|
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

The codebook in Table 5 includes a precoding matrix for layer 2 transmission using four antenna ports and a CP-OFDM waveform. TPMI index values 0 to 5 correspond to incoherent precoding matrices, index values 6 to 13 correspond to partially coherent precoding matrices, and index values 14 to 21 correspond to fully coherent precoding matrices.

TABLE 6

Precoding matrix table for layer 3 transmission using four antenna ports and a CP-OFDM waveform

| TPMI index | W |
|---|---|
| 0-3 | $\frac{1}{2}\begin{bmatrix}1&0&0\\0&1&0\\0&0&1\\0&0&0\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ $\frac{1}{2\sqrt{3}}\begin{bmatrix}1&1&1\\-1&1&-1\\1&1&-1\\-1&1&1\end{bmatrix}$ $\frac{1}{2\sqrt{3}}\begin{bmatrix}1&1&1\\-1&1&-1\\j&j&-j\\-j&j&j\end{bmatrix}$ — |

The codebook in Table 6 includes a precoding matrix for layer 3 transmission using four antenna ports and a CP-OFDM waveform. TPMI index value 0 corresponds to an incoherent precoding matrix, index values 1 and 2 correspond to partially coherent precoding matrices, and index values 3 to 6 correspond to fully coherent precoding matrices.

TABLE 7

Precoding matrix table for layer 4 transmission using four antenna ports and a CP-OFDM waveform

| TPMI index | W |
|---|---|
| 0-3 | $\frac{1}{2}\begin{bmatrix}1&0&0&0\\0&1&0&0\\0&0&1&0\\0&0&0&1\end{bmatrix}$ $\frac{1}{2\sqrt{2}}\begin{bmatrix}1&1&0&0\\0&0&1&1\\1&-1&0&0\\0&0&1&-1\end{bmatrix}$ $\frac{1}{2\sqrt{2}}\begin{bmatrix}1&1&0&0\\0&0&1&1\\j&-j&0&0\\0&0&j&-j\end{bmatrix}$ $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ — — — |

The codebook in Table 7 includes a precoding matrix for layer 4 transmission using four antenna ports and a CP-OFDM waveform. TPMI index value 0 corresponds to an incoherent precoding matrix, index values 1 and 2 correspond to partially coherent precoding matrices, and index values 3 and 4 correspond to fully coherent precoding matrices.

A process in which the network device indicates, to the terminal device based on the codebooks in Table 1 to Table 7, an antenna port for sending a PUSCH and a corresponding precoding matrix includes: Before uplink transmission, the terminal device sends an SRS on a corresponding time-frequency resource based on an SRS resource configuration, and the network device receives and measures the SRS on the corresponding time-frequency resource, to obtain an SRS measurement result. The network device determines, in the foregoing predefined codebook based on a result of the latest SRS measurement, a precoding matrix for sending the PUSCH by the terminal device, where a quantity of ports corresponding to the codebook and the precoding matrix is the same as a quantity of ports of the latest SRS; and the network device instructs, by sending DCI, the terminal device to send the PUSCH. The DCI indicates PUSCH transmission parameters, including: a quantity of precoding layers and a TPMI. The TPMI may support indication of 2-port and 4-port precoding matrices, and different quantities of antenna ports and different quantities of precoding layers correspond to different precoding matrix tables. After receiving the quantity of precoding layers and the indication information of the TPMI, the terminal device determines the quantity of antenna ports based on the quantity of SRS ports in the SRS resource configuration, determines the precoding matrix table based on the corresponding quantity of antenna ports and the quantity of precoding layers, and then searches the corresponding precoding matrix table for the precoding matrix corresponding to the TPMI.

When the network device indicates, to the terminal device based on the codebooks in Table 1 to Table 7, the antenna port for sending the PUSCH and the corresponding precoding matrix, the network device determines, in the predefined codebook based on the latest SRS measurement result, the precoding matrix for sending the PUSCH by the terminal device. A quantity of ports corresponding to the codebook and the precoding matrix is the same as a quantity of ports of the latest SRS. For example, if the quantity of SRS ports is 2, the corresponding precoding matrix is selected from Table 1 and Table 2; or if the quantity of SRS ports is 4, the corresponding precoding matrix is selected from Table 3 to Table 7. It can be learned from Table 1 to Table 7 that the protocol supports only 2-port and 4-port codebooks.

However, in an uplink enhancement solution of transmit channel resource pooling, transmission on three transmit channels may be allowed according to a capability of the terminal device. However, based on the codebooks in Table 1 to Table 7, a codebook of three ports is not supported, that is, the TPMI indicates that indication of a precoding matrix associated with three ports is not supported, that is, transmission on three transmit channels is not supported. Consequently, flexibility of transmit channel switching is limited, and a performance loss may be caused.

In addition, in the uplink enhancement solution of transmit channel resource pooling, the network device determines a precoding matrix on each carrier based on SRS measurement results on a plurality of SRS resources, and cannot directly infer, from a quantity of SRS ports in an SRS resource configuration, an actual quantity of antenna ports for sending the PUSCH. If TPMI indication is performed based on only the codebooks in Table 1 to Table 7, the terminal device cannot accurately determine an antenna port for sending a PUSCH or select a precoding matrix from a precoding matrix table.

For example, when the quantity of SRS ports configured by the network device is 3 or 4, and the network device indicates that the quantity of antenna ports for sending the PUSCH is 2 or 3, the 4-port codebook in Table 1 to Table 7 cannot meet a requirement. For another example, if a quantity of configured SRS ports is 4, transmit antenna ports corresponding to SRS ports 0 to 3 are transmit antenna ports 0 to 3. If the transmit antenna ports 0 to 1 need to be scheduled for sending the PUSCH, it is assumed that the network device needs to configure the terminal device with the following precoding matrix for layer 1 transmission:

$$\begin{bmatrix} 1 \\ 1 \\ 0 \\ 0 \end{bmatrix},$$

or the following precoding matrix for layer 2 transmission:

$$\begin{bmatrix} 1 & 1 \\ 1 & -1 \\ 0 & 0 \\ 0 & 0 \end{bmatrix}.$$

None of the precoding matrices is included in the codebooks in Table 3 to Table 5. Therefore, TPMI indication cannot be performed based on the codebooks in Table 3 to Table 5.

Therefore, the uplink precoding codebook and TPMI-based indication method are enhanced to ensure the maximum degree of freedom of resource pooling of transmit channels and improve uplink transmission performance, so as to increase the uplink capacity by using the uplink enhancement solution of transmit channel resource pooling, enable the uplink precoding codebook and TPMI indication to meet the requirements of transmit channel resource pooling, and implement flexible and accurate PUSCH scheduling.

Therefore, embodiments of this application provide the following technical solutions. For specific content of the technical solutions, refer to the following descriptions.

The technical solutions provided in embodiments of this application may be applied to various communication systems, for example, a new radio (NR) communication system using a 5th generation (5G) communication technology, a future evolved system, or a plurality of convergent communication systems. The technical solutions provided in this application may be applied to a plurality of application scenarios, such as machine to machine (M2M), macro-micro communication, enhanced mobile broadband (eMBB), ultra-reliable & low latency communication (uRLLC), massive machine type communication (mMTC), device to device (D2D) communication, vehicle to everything (V2X), vehicle to vehicle (V2V), long term evolution-vehicle (LTE-V), long term evolution-machine (LTE-M). These scenarios may include but are not limited to a scenario of communication between terminal devices, a scenario of communication between network devices, a scenario of communication between a network device and a terminal device, and the like. The following provides descriptions by using an example in which the technical solutions are applied to a scenario of communication between a network device and a terminal device.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

FIG. 1 is a schematic diagram of a communication system to which the technical solutions provided in this application are applicable. The communication system may include one or more network devices 101 (FIG. 1 shows only one network device) and one or more terminal devices 102 (FIG. 1 shows only one terminal device).

The network device may be a base station, a base station controller, or the like in wireless communication. The base station may include various types of base stations, such as a micro base station (also referred to as a small cell), a macro base station, a relay station, and an access point. This is not specifically limited in this embodiment of this application. In this embodiment of this application, the base station may be a base transceiver station (BTS) in a global system for mobile communications (GSM) or code division multiple access (CDMA), a NodeB in wideband code division multiple access (WCDMA), an evolved NodeB (evolved NodeB, eNB or e-NodeB) in long term evolution (LTE), an eNB in the Internet of Things (IoT) or the narrowband Internet of Things (NB-IoT), or a base station in a future 5G mobile communication network or a future evolved public land mobile network (PLMN). This is not limited in this embodiment of this application. In this embodiment of this application, an apparatus configured to implement a function of the network device may be a network device, or may be an apparatus that can support the network device in implementing the function, for example, a chip system. In embodiments of this application, an example in which the apparatus configured to implement the function of the network device is a network device is used to describe the technical solutions provided in embodiments of this application.

In some deployments, the base station may include a centralized unit (CU) and a distributed unit (DU). The base station may further include an active antenna unit (AAU). The CU implements some functions of the base station, and the DU implements some functions of the base station. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU performs some physical layer processing functions, radio frequency processing functions, and functions related to active antennas. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that the network device may be a device including one or more of a CU node, a DU node, and an AAU node. In addition, the CU may be classified as a network device in a RAN, or the CU may be classified as a network device in a core network (CN). This is not limited herein.

The terminal is a device that has a wireless transceiver function. The terminal may be deployed on land, including an indoor or outdoor device, a handheld device, or a vehicle-mounted device, or may be deployed on a water surface (for example, on a ship), or may be deployed in air (for example, on aircraft, a balloon, or a satellite). The terminal device may be user equipment (UE). The UE includes a handheld device, a vehicle, a vehicle-mounted device, a wearable device, or a computing device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in a smart city, a wireless terminal in a smart home, or the like. In this embodiment of this application, an apparatus for implementing a function of the terminal may be a terminal, or may be an apparatus that can support the terminal in implementing the function, for example, a chip system. In this embodiment of this application, the chip system may include a chip, or may include a chip and another discrete device. In embodiments of this application, an example in which the apparatus configured to implement the function of the terminal is a terminal is used to describe the technical solutions provided in embodiments of this application.

The following describes in detail communication methods provided in embodiments of this application with reference to FIG. 1.

Figure 2:
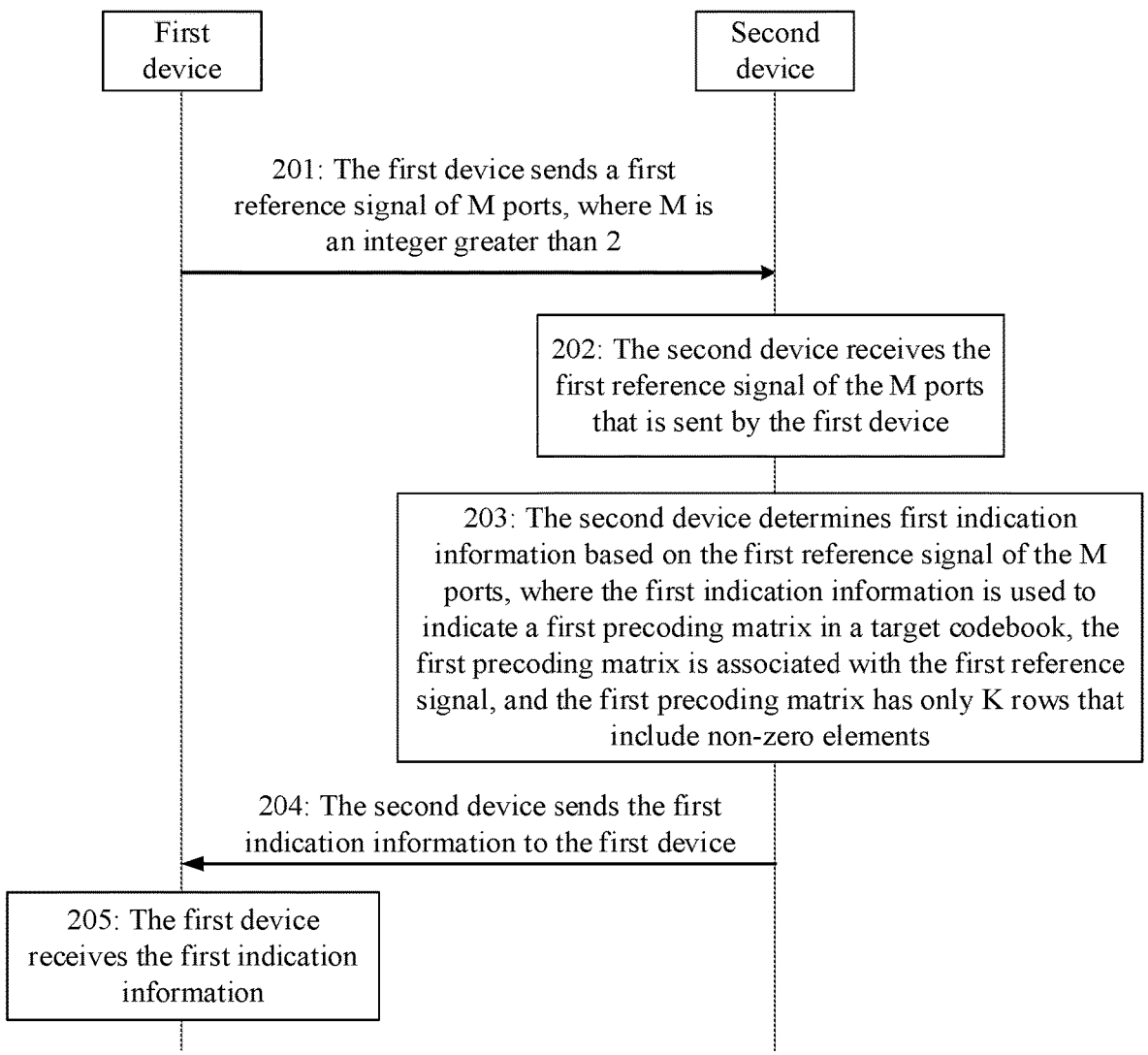
FIG. 2 is a flowchart of a communication method according to an embodiment of this application.

FIG. 2 is a flowchart of a communication method according to an embodiment of this application. The method may be applied to the communication system shown in FIG. 1. A first device may be the terminal device 102 in FIG. 1; and correspondingly, a second device may be the network device 101 in FIG. 1. As shown in FIG. 2, the method may include the following steps.

Step 201: The first device sends a first reference signal of M ports, where M is an integer greater than 2.

For example, the first reference signal may be an SRS signal; and the M ports may be M SRS ports, and the M SRS ports are in a one-to-one correspondence with M transmit antenna ports. The first device may send the SRS on a corresponding time-frequency resource based on the SRS resource configuration. The time-frequency location of the first reference signal may be configured by the second device. For example, the second device configures M SRS ports for the first device, which are denoted as SRS ports 0 to M. Correspondingly, the second device configures M transmit antenna ports for the first device, which are denoted as transmit antenna ports 0 to M. The M SRS ports are in a one-to-one correspondence with the M transmit antenna ports. To be specific, the SRS port 0 corresponds to the transmit antenna port 0, the SRS port 1 corresponds to the transmit antenna port 1, and by analogy, the SRS port M corresponds to the transmit antenna port M.

Step 202: The second device receives the first reference signal of the M ports that is sent by the first device.

For example, the second device may receive, on the corresponding time-frequency resource, the SRS sent by the first device.

Step 203: The second device determines first indication information based on the first reference signal of the M ports.

For example, the second device may measure the SRS to obtain an SRS measurement result. The SRS measurement result may be uplink channel information of each transmit channel on a carrier corresponding to the transmit channel. The second device determines the first indication information based on the SRS measurement result.

The first indication information is used to indicate a first precoding matrix in a target codebook, a quantity of rows in the first precoding matrix is M, and the first precoding matrix is associated with a first reference signal; for example, the first precoding matrix is associated with M SRS ports, that is, the first precoding matrix is located in the target codebook corresponding to the M quantities of SRS ports of. In other words, a transmit antenna port corresponding to an $m^{th}$ row of the first precoding matrix is a transmit antenna port corresponding to an $m^{th}$ SRS port, where m=1, 2, . . . , M.

For example, the target codebook may be one or more codebooks shown in Table 1 to Table 7, or may be one or more codebooks shown in Table 8-13 below. For example, when M=3, the target codebook may be one or more codebooks shown in Table 8 to Table 10. For another example, when M=4, the target codebook may be one or more codebooks shown in Table 11 to Table 13.

For example, the target codebook may be preconfigured by the first device and the second device, for example, may be stored in a storage medium or a chip of the first device or the second device before delivery.

The target codebook includes at least one target precoding matrix, a quantity of rows in the target precoding matrix may be M, and the first precoding matrix indicated by the first indication information is at least one target precoding matrix in the precoding codebook of the M ports.

In a possible implementation, only two rows in a target precoding matrix in the target codebook include non-zero elements, a quantity of columns in the target precoding matrix is 2, and the target precoding matrix is a partially coherent precoding matrix. In this case, the target precoding matrix in the target codebook may be used to indicate the first device to perform layer 2 precoding by using only two of the M ports. The partially coherent precoding matrix is a precoding matrix in which one column includes more than one and less than M non-zero elements.

For example, when only two rows in the target precoding matrix include non-zero elements, the two rows in the target precoding matrix that include the non-zero elements are determined by the matrix [a, b; c, d], where a, b, c, and d are elements in a set $\{1/A_1, -1/A_1, j/A_1, -j/A_1\}$, j is an imaginary unit, and $A_1$ is a positive constant. Optionally, the two rows in the target precoding matrix that include non-zero elements each have any row location in the target precoding matrix.

In a possible implementation, only three rows in a precoding matrix in the target codebook include non-zero elements, and the target precoding matrix is a partially coherent precoding matrix or a coherent precoding matrix. In this case, the first precoding matrix may be used to indicate the first device to use only three of the M ports to perform precoding; and the coherent precoding matrix is a precoding moment in which all columns include M non-zero elements.

For example, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, and $A_2$ is a positive constant. Optionally, the three rows in the target precoding matrix that include non-zero elements each have any row location in the target precoding matrix.

In a possible implementation, only K rows in a target precoding matrix in the target codebook include non-zero elements, where K is an integer less than M and not less than 4, and the target precoding matrix is a partially coherent precoding matrix. In this case, the target precoding matrix may be used to indicate the first device to perform precoding by using only K ports of the M ports.

For example, when only K rows in the target precoding matrix include non-zero elements, the non-zero elements are elements in $\{e^{jk\pi/K}/A_3\}$, where k=0, 1, 2, . . . , K−1, j is an imaginary unit, and $A_3$ is a positive constant. Optionally, the K rows in the target precoding matrix that include the non-zero elements each may have any row location.

In a possible implementation, a waveform to which the target precoding matrix is applicable may include a DFT-s-OFDM waveform, a CP-OFDM waveform, or another waveform. For example, a DFT-s-OFDM waveform may be used in a power-limited scenario, and the waveform supports data transmission with a maximum of a single flow, and a single carrier feature is ensured. A cyclic prefix CP-OFDM waveform may be used in a resource-limited scenario, and the waveform supports single-flow or multi-flow data transmission, to improve spectral efficiency of a communication system.

In a possible implementation, the target codebook may be in a form of a precoding matrix table, the precoding matrix table includes at least one target precoding matrix, and each target precoding matrix is indicated by one TPMI index.

In a possible implementation, the first indication information may include indication information of a quantity of precoding layers and/or indication information of a first TPMI, where the quantity of precoding layers is used to determine a target codebook, and the first TPMI is an index of the first precoding matrix in the target codebook, that is, the index of the first precoding matrix used as the target precoding matrix, in the target codebook. Optionally, the quantity of precoding layers and the first TPMI may be carried in a same field or different fields. For example, the second device determines the first precoding matrix based on the SRS measurement result, where the quantity of precoding layers is a quantity of columns in the first precoding matrix, the target codebook is a codebook corresponding to the quantity of precoding layers, and the first TPMI is an index of the first precoding matrix in the target codebook, so as to determine the first indication information.

For example, when the quantity of columns in the target precoding matrix is greater than 1, any two columns in the target precoding matrix are orthogonal column vectors.

Step 204: The second device sends the first indication information to the first device.

For example, the second device may send, to the first device, the indication information indicating the first TPMI and/or the quantity of precoding layers. Optionally, one field may be used to indicate the first TPMI, and the other field indicates the quantity of precoding layers. Alternatively, one field may be sent to jointly indicate the first TPMI and the quantity of precoding layers. For example, a precoding information and a quantity of precoding layers field in the DCI may be used, and this field may occupy six bits, different bit values of the six bits indicate the first TPMI and the quantity of precoding layers. For example, the 000000 indicates that the first TPMI is 0 and the quantity of precoding layers is 1; the 000001 indicates that the first TPMI is 1 and the quantity of precoding layers is 1; and 011001 indicates that the first TPMI is 2 and the quantity of precoding layers is 3.

Step 205: The first device receives the first indication information.

For example, the first device may receive the indication information indicating the first TPMI and/or the quantity of precoding layers. Further, the first device may determine the quantity of transmit antenna ports based on the quantity of SRS ports in the SRS resource configuration, then determine a target codebook (for example, a precoding matrix table) based on the quantity of corresponding transmit antenna ports and the quantity of precoding layers, and finally determine the first precoding matrix in the target codebook by using the first TPMI.

In this embodiment of this application, for an uplink enhancement solution of transmit channel resource pooling of a terminal device, a target codebook of M ports may be supported, and the first indication information is used to indicate a first precoding matrix in the target codebook, so that a plurality of transmit channels can be selected from the M transmit channels for uplink transmission. This ensures a maximum degree of freedom of uplink transmit channel resource pooling, and improves uplink transmission performance.

The following describes the communication method in FIG. 2 by using an example in which M is 3.

Figure 3:
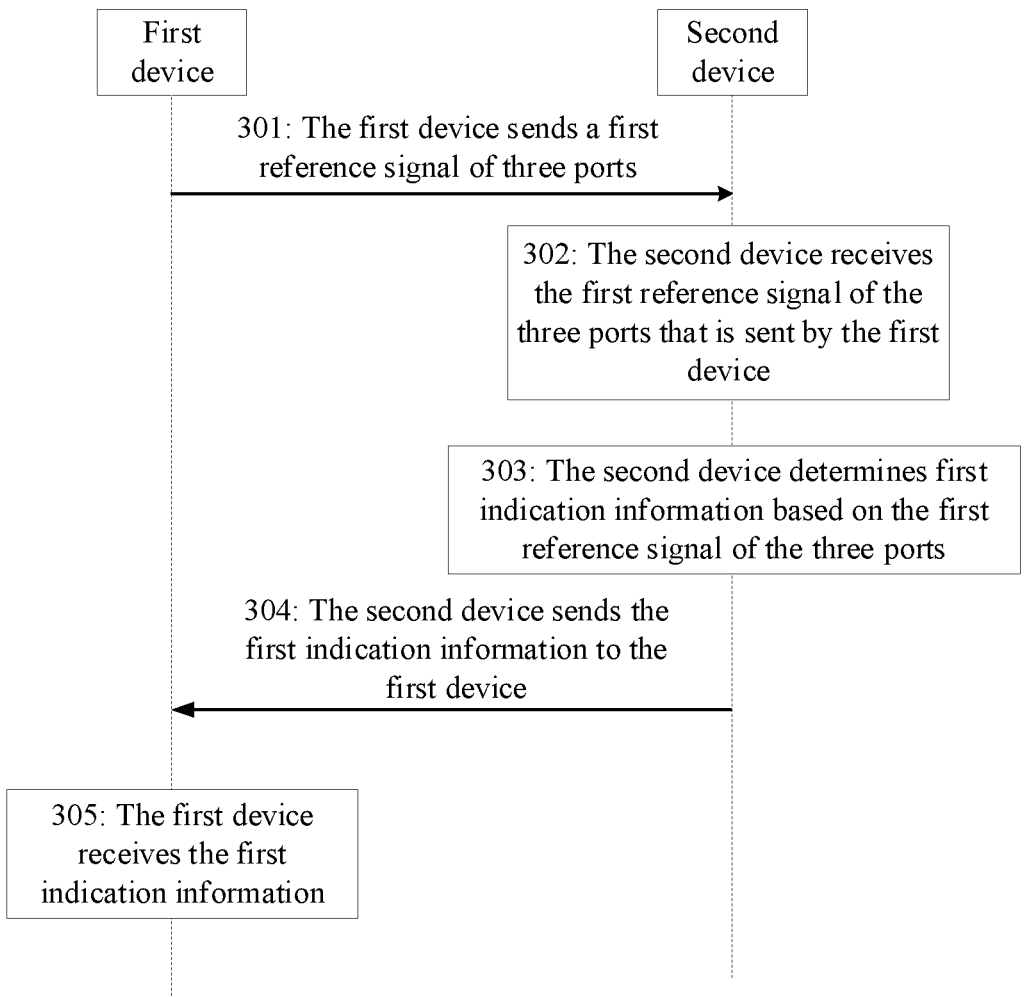
FIG. 3 is a flowchart of another communication method according to an embodiment of this application.

FIG. 3 is a flowchart of another communication method according to an embodiment of this application. The method may be applied to the communication system shown in FIG. 1. A first device may be the terminal device 102 in FIG. 1; and correspondingly, a second device may be the network device 101 in FIG. 1. As shown in FIG. 3, the method may include the following steps.

Step 301: A first device sends a first reference signal of three ports.

For example, the first reference signal may be an SRS signal; the three ports may be three SRS ports, and the three SRS ports correspond to three transmit antenna ports; and a time-frequency location of the first reference signal of the three ports may be configured by a second device.

Step 302: The second device receives the first reference signal of the three ports that is sent by the first device.

For example, the second device may receive, on the corresponding time-frequency resource, the SRS sent by the first device.

Step 303: The second device determines first indication information based on the first reference signal of the three ports.

For example, the second device may measure the SRS to obtain an SRS measurement result. The SRS measurement result may be uplink channel information of three transmit channels on carriers corresponding to the three transmit channels. The second device determines the first indication information based on the SRS measurement result.

The first indication information is used to indicate a first precoding matrix in a target codebook, and the first precoding matrix is associated with the first reference signal of the three ports. The target codebook includes at least one target precoding matrix, and a quantity of rows in the target precoding matrix may be 3. In other words, the target codebook is a 3-port precoding codebook. The first precoding matrix indicated by the first indication information is at least one target precoding matrix in the 3-port precoding codebook.

To meet an uplink enhancement requirement for transmit channel resource pooling of the terminal device, this embodiment of this application provides a 3-port precoding codebook.

In some examples, in the 3-port precoding codebook, a quantity of columns in the target precoding matrix is 2, only two rows in the target precoding matrix include non-zero elements, and the target precoding matrix is a partially coherent precoding matrix. In this case, the target precoding matrix may be used to indicate the first device to perform precoding by using two of the three ports.

For example, non-zero rows (that is, two rows including non-zero elements) of the target precoding matrix are determined by [a1, b1; c1, d1], where a1, b1, c1, and d1 are elements in $\{1/A_1, -1/A_1, j/A_1, -j/A_1\}$, j is an imaginary unit, and $A_1$ is a positive constant representing a factor for normalizing a precoding vector power in the codebook. The two rows in the target precoding matrix that include the non-zero elements each may have any row location. For example, any two columns in the target precoding matrix are orthogonal column vectors.

The target precoding matrix may be represented as $$\begin{bmatrix} a1 & b1 \\ c1 & d1 \\ 0 & 0 \end{bmatrix}, \begin{bmatrix} a1 & b1 \\ 0 & 0 \\ c1 & d1 \end{bmatrix}, \text{or} \begin{bmatrix} 0 & 0 \\ a1 & b1 \\ c1 & d1 \end{bmatrix},$$

where a1, b1, c1, and d1 are elements in $\{1/A_1, -1/A_1, j/A_1, -j/A_1\}$.

For example, when $A_1$ is 2, a1, b1, c1, and d1 are elements in $\{½, -½, j/2, -j/2\}$, and the target precoding matrix may be:

$$\frac{1}{2}\begin{bmatrix} 1 & 1 \\ 1 & -1 \\ 0 & 0 \end{bmatrix}, \frac{1}{2}\begin{bmatrix} 1 & 1 \\ j & -j \\ 0 & 0 \end{bmatrix}, \frac{1}{2}\begin{bmatrix} 1 & 1 \\ 0 & 0 \\ 1 & -1 \end{bmatrix}, \frac{1}{2}\begin{bmatrix} 1 & 1 \\ 0 & 0 \\ j & -j \end{bmatrix}, \frac{1}{2}\begin{bmatrix} 0 & 0 \\ 1 & 1 \\ 1 & -1 \end{bmatrix}, \frac{1}{2}\begin{bmatrix} 0 & 0 \\ 1 & 1 \\ j & -j \end{bmatrix},$$

It may be understood that the listed target precoding matrices are merely examples, and are not exhaustive; any two columns in the listed target precoding matrices are orthogonal column vectors; and the listed target precoding matrices are partially coherent precoding matrices.

In some examples, in the 3-port precoding codebook, three rows in the target precoding matrix include non-zero elements, and the target precoding matrix is a partially coherent precoding matrix or a coherent precoding matrix. The coherent precoding matrix is a precoding matrix in which all columns include three non-zero elements. In this case, the target precoding matrix may be used to indicate the first device to perform precoding by using all of the three ports.

For example, the non-zero element in the target precoding matrix is an element in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, and $A_2$ is a positive constant representing a factor for normalizing a precoding vector power in a codebook. The three rows in the target precoding matrix that include the non-zero elements each may have any row location. For example, any two columns in the target precoding matrix are orthogonal column vectors.

In the 3-port precoding codebook, when the quantity of columns in the target precoding matrix is 2, the target precoding matrix may be represented as $$\begin{bmatrix} a2 & b2 \\ c2 & d2 \\ e2 & f2 \end{bmatrix},$$

where at least one of a2 and b2 is a non-zero element, at least one of c2 and d2 is a non-zero element, and at least one of e2 and f2 is a non-zero element. When any one of a2, b2, c2, d2, e2 and f2 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

For example when $A_2$ is $\sqrt{3}$, that is, the non-zero element is an element in $$\left\{1/\sqrt{3}, e^{\frac{j\pi}{3}}/\sqrt{3}, e^{\frac{j2\pi}{3}}/\sqrt{3}, -1/\sqrt{3}, -e^{\frac{j2\pi}{3}}/\sqrt{3}, -e^{\frac{j\pi}{3}}/\sqrt{3}\right\},$$

the target precoding matrix may be:

$$\frac{1}{\sqrt{3}}\begin{bmatrix} 1 & 0 \\ 1 & 0 \\ 0 & 1 \end{bmatrix}, \frac{1}{\sqrt{3}}\begin{bmatrix} 1 & 0 \\ 0 & 1 \\ 1 & 0 \end{bmatrix}, \frac{1}{\sqrt{3}}\begin{bmatrix} 0 & 1 \\ 1 & 0 \\ 1 & 0 \end{bmatrix}, \frac{1}{\sqrt{3}}\begin{bmatrix} 0 & 1 \\ 1 & 0 \\ 1 & 0 \end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example when $A_2$ is V, that is, the non-zero element is an element in $$\left\{1/\sqrt{6}, e^{\frac{j\pi}{3}}/\sqrt{6}, e^{\frac{j2\pi}{3}}/\sqrt{6}, -1/\sqrt{6}, -e^{\frac{j2\pi}{3}}/\sqrt{6}, -e^{\frac{j\pi}{3}}/\sqrt{6}\right\},$$

the target precoding matrix may be:

$$\frac{1}{\sqrt{6}}\begin{bmatrix} 1 & 1 \\ 1 & -e^{j\pi/3} \\ 1 & e^{j2\pi/3} \end{bmatrix},$$

It may be understood that the listed target precoding matrices are merely examples, and are not exhaustive; any two columns in the listed target precoding matrices are orthogonal column vectors; and the listed target precoding matrices are partially coherent precoding matrices or coherent precoding matrices.

In the 3-port precoding codebook, when the quantity of columns in the target precoding matrix is 3, the target precoding matrix may be represented as $$\begin{bmatrix} a3 & b3 & c3 \\ d3 & e3 & f3 \\ g3 & h3 & k3 \end{bmatrix},$$

where at least one of a3, b3, and c3 is a non-zero element, at least one of d3, e3, and f3 is a non-zero element, and at least one of g3, h3, and k3 is a non-zero element. When any one of a3, b3, c3, d3, e3, f3, g3, h3, and k3 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

For example, when $A_2$ is V, that is, the non-zero element is an element in $$\left\{1/\sqrt{3},\, e^{\frac{j\pi}{3}}/\sqrt{3},\, e^{\frac{j2\pi}{3}}/\sqrt{3},\, -1/\sqrt{3},\, -e^{\frac{j2\pi}{3}}/\sqrt{3},\, -e^{\frac{j\pi}{3}}/\sqrt{3}\right\},$$

the target precoding matrix may be:

$$\frac{1}{\sqrt{3}}\begin{bmatrix} 1 & 0 & 0 \\ 0 & 1 & 0 \\ 0 & 0 & 1 \end{bmatrix},\; \frac{1}{\sqrt{3}}\begin{bmatrix} 1 & 0 & 0 \\ 0 & -1 & 0 \\ 0 & 0 & -1 \end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example when $A_2$ is $\sqrt{6}$, that is, the non-zero element is an element in $$\left\{1/\sqrt{6},\, e^{\frac{j\pi}{3}}/\sqrt{6},\, e^{\frac{j2\pi}{3}}/\sqrt{6},\, -1/\sqrt{6},\, -e^{\frac{j2\pi}{3}}/\sqrt{6},\, -e^{\frac{j\pi}{3}}/\sqrt{6}\right\},$$

the target precoding matrix may be:

$$\frac{1}{\sqrt{6}}\begin{bmatrix} 1 & 1 & 0 \\ 1 & -1 & 0 \\ 0 & 0 & 1 \end{bmatrix},\; \frac{1}{\sqrt{6}}\begin{bmatrix} 1 & 1 & 0 \\ 1 & -1 & 0 \\ 0 & 0 & -1 \end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example when $A_2$ is 3, that is, the non-zero element is an element in $$\left\{1/3,\, e^{\frac{j\pi}{3}}/3,\, e^{\frac{j2\pi}{3}}/3,\, -1/3,\, -e^{\frac{j2\pi}{3}}/3,\, -e^{\frac{j\pi}{3}}/3\right\},$$

the target precoding matrix may be:

$$\frac{1}{3}\begin{bmatrix} 1 & 1 & 1 \\ 1 & -e^{j\pi/3} & e^{j\pi/3} \\ 1 & e^{j2\pi/3} & e^{j2\pi/3} \end{bmatrix},$$

or the like.

It may be understood that the listed target precoding matrices are merely examples, and are not exhaustive; and the listed target precoding matrices are partially coherent precoding matrices.

For example, the target codebook is a 3-port precoding codebook, as shown in Table 8 to Table 10. W represents target precoding matrices, each row in each target precoding matrix corresponds to one transmit antenna port, and each column corresponds to one transmission layer; and one TPMI index corresponds to one target precoding matrix.

TABLE 8

| TPMI index | W |
|---|---|
| 0-7 | $\begin{bmatrix}1\\0\\0\end{bmatrix}$ $\begin{bmatrix}0\\1\\0\end{bmatrix}$ $\begin{bmatrix}0\\0\\1\end{bmatrix}$ $\frac{1}{\sqrt{2}}\begin{bmatrix}1\\1\\0\end{bmatrix}$ $\frac{1}{\sqrt{2}}\begin{bmatrix}1\\-1\\0\end{bmatrix}$ $\frac{1}{\sqrt{2}}\begin{bmatrix}1\\j\\0\end{bmatrix}$ $\frac{1}{\sqrt{2}}\begin{bmatrix}1\\-j\\0\end{bmatrix}$ $\frac{1}{\sqrt{2}}\begin{bmatrix}1\\0\\1\end{bmatrix}$ |
| 8-15 | $\frac{1}{\sqrt{2}}\begin{bmatrix}1\\0\\-1\end{bmatrix}$ $\frac{1}{\sqrt{2}}\begin{bmatrix}1\\0\\j\end{bmatrix}$ $\frac{1}{\sqrt{2}}\begin{bmatrix}1\\0\\-j\end{bmatrix}$ $\frac{1}{\sqrt{2}}\begin{bmatrix}0\\1\\1\end{bmatrix}$ $\frac{1}{\sqrt{2}}\begin{bmatrix}0\\1\\-1\end{bmatrix}$ $\frac{1}{\sqrt{2}}\begin{bmatrix}0\\1\\j\end{bmatrix}$ $\frac{1}{\sqrt{2}}\begin{bmatrix}0\\1\\-j\end{bmatrix}$ $\frac{1}{\sqrt{3}}\begin{bmatrix}1\\1\\1\end{bmatrix}$ |
| 16-- | $\frac{1}{\sqrt{3}}\begin{bmatrix}1\\a0\\b0\end{bmatrix}$ |

Precoding matrix table for layer 1 transmission using three antenna ports

The codebook in Table 8 includes a target precoding matrix for layer 1 transmission using three antenna ports. a0 and b0 are elements in $\{1, e^{j\pi/3}, e^{j2\pi/3}, -1, -e^{j2\pi/3}, -e^{j\pi/3}\}$.

TABLE 9

Precoding matrix table for layer 2 transmission using three antenna ports

| TPMI index | W | | | |
|---|---|---|---|---|
| 0-3 | $\frac{1}{\sqrt{2}}\begin{bmatrix} 1 & 0 \\ 0 & 1 \\ 0 & 0 \end{bmatrix}$ | $\frac{1}{\sqrt{2}}\begin{bmatrix} 1 & 0 \\ 0 & 0 \\ 0 & 1 \end{bmatrix}$ | $\frac{1}{\sqrt{2}}\begin{bmatrix} 0 & 0 \\ 0 & 1 \\ 1 & 0 \end{bmatrix}$ | $\frac{1}{\sqrt{2}}\begin{bmatrix} 0 & 0 \\ 1 & 0 \\ 0 & 1 \end{bmatrix}$ |
| 4~ | $\begin{bmatrix} a1 & b1 \\ c1 & d1 \\ 0 & 0 \end{bmatrix}$ | $\begin{bmatrix} a1 & b1 \\ 0 & 0 \\ c1 & d1 \end{bmatrix}$ | $\begin{bmatrix} 0 & 0 \\ a1 & b1 \\ c1 & d1 \end{bmatrix}$ | $\begin{bmatrix} a2 & b2 \\ c2 & d2 \\ e2 & f2 \end{bmatrix}$ |

The codebook in Table 9 includes a target precoding matrix for layer 2 transmission using three antenna ports, where a1, b1, c1, and d1 are elements in $\{1/A_1, -1/A_1, j/A_1, -j/A_1\}$, where at least one of a2 and b2 is a non-zero element, at least one of c2 and d2 is a non-zero element, and at least one of e2 and f2 is a non-zero element. When any one of a2, b2, c2, d2, e2, or f2 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

TABLE 10

Precoding matrix table for layer 3 transmission using three antenna ports

| TPMI index | W |
|---|---|
| 0~ | $\begin{bmatrix} a3 & b3 & c3 \\ d3 & e3 & f3 \\ g3 & h3 & k3 \end{bmatrix}$ |

The codebook in Table 10 includes a target precoding matrix for layer 3 transmission using three antenna ports, where at least one of a3, b3, and, c3 is a non-zero element, at least one of d3, e3, and f3 is a non-zero element, and at least one of g3, h3, and k3 is a non-zero element. When any one of a3, b3, c3, d3, e3, f3, g3, h3, and k3 is a non-zero element, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$.

It should be noted that forms of the target precoding matrices in Table 8 to Table 10 and index values corresponding to the target precoding matrices are merely examples. This is not limited in this embodiment of this application. In addition, the precoding matrix tables of the codebooks in Table 8 to Table 10 are applicable to a CP-OFDM waveform, a DFT-s-OFDM waveform, and the like. The waveform to which the target precoding matrix table is applicable is not limited in this embodiment of this application.

For example, any two columns in the target precoding matrix in Table 9 and Table 10 are orthogonal column vectors.

In a possible implementation, the first indication information includes indication information of a first TPMI and/or indication information of a quantity of precoding layers. The quantity of precoding layers is used to determine a target codebook, that is, determine that a precoding matrix table in Table 8, Table 9, or Table 10 is the target codebook. The first TPMI is an index of the first precoding matrix in the target codebook. For example, the second device determines, based on the SRS measurement result, that the first precoding matrix is $$\frac{1}{\sqrt{2}}\begin{bmatrix} 1 & 0 \\ 0 & 0 \\ 0 & 1 \end{bmatrix},$$

and determines that the quantity of precoding layers of the first precoding matrix is 2. In this case, a codebook for layer 2 transmission using three ports (that is, the precoding matrix table shown in Table 9) is the target codebook, and an index value of the first precoding matrix $$\frac{1}{\sqrt{2}}\begin{bmatrix} 1 & 0 \\ 0 & 0 \\ 0 & 1 \end{bmatrix}$$

in the precoding matrix table shown in Table 9 is 1, and then it is determined that the first TPMI is 1.

Step 304: The second device sends the first indication information to the first device.

In this step, the second device may send, to the first device, indication information indicating the first TPMI and/or the quantity of precoding layers. For example, one field may be sent to jointly indicate that the first TPMI is 1 and the quantity of precoding layers is 2; or two fields may be sent, where one field indicates that the first TPMI is 1, and the other field indicates that the quantity of precoding layers is 2.

Step 305: The first device receives the first indication information.

For example, the first device may receive the indication information indicating the first TPMI and/or the quantity of precoding layers. Further, the first device may determine, based on the three SRS ports in the SRS resource configuration, that the quantity of transmit antenna ports is 3, then determine the precoding matrix table based on the three transmit antenna ports and the quantity of precoding layers, and finally determine, based on the first TPMI, the first precoding matrix in the precoding matrix table. For example, the first indication information indicates that the quantity of precoding layers is 2, and the index value indicated by the first TPMI is 1. A codebook for layer 2 transmission using three ports (as shown in Table 9) may be searched, to determine that the first precoding matrix corresponding to the index value 1 is $$\frac{1}{\sqrt{2}}\begin{bmatrix} 1 & 0 \\ 0 & 0 \\ 0 & 1 \end{bmatrix}.$$

In this embodiment of this application, for an uplink enhancement solution of transmit channel resource pooling of the terminal device, a 3-port precoding codebook is designed, and the first indication information is used to indicate the first precoding matrix in the 3-port precoding codebook, so that uplink transmission on a maximum of three transmit channels on a same carrier can be supported. This ensures a maximum degree of freedom of uplink transmit channel resource pooling, and improves uplink transmission performance.

The following describes the communication method in FIG. 2 by using an example in which M is 4.

Figure 4:
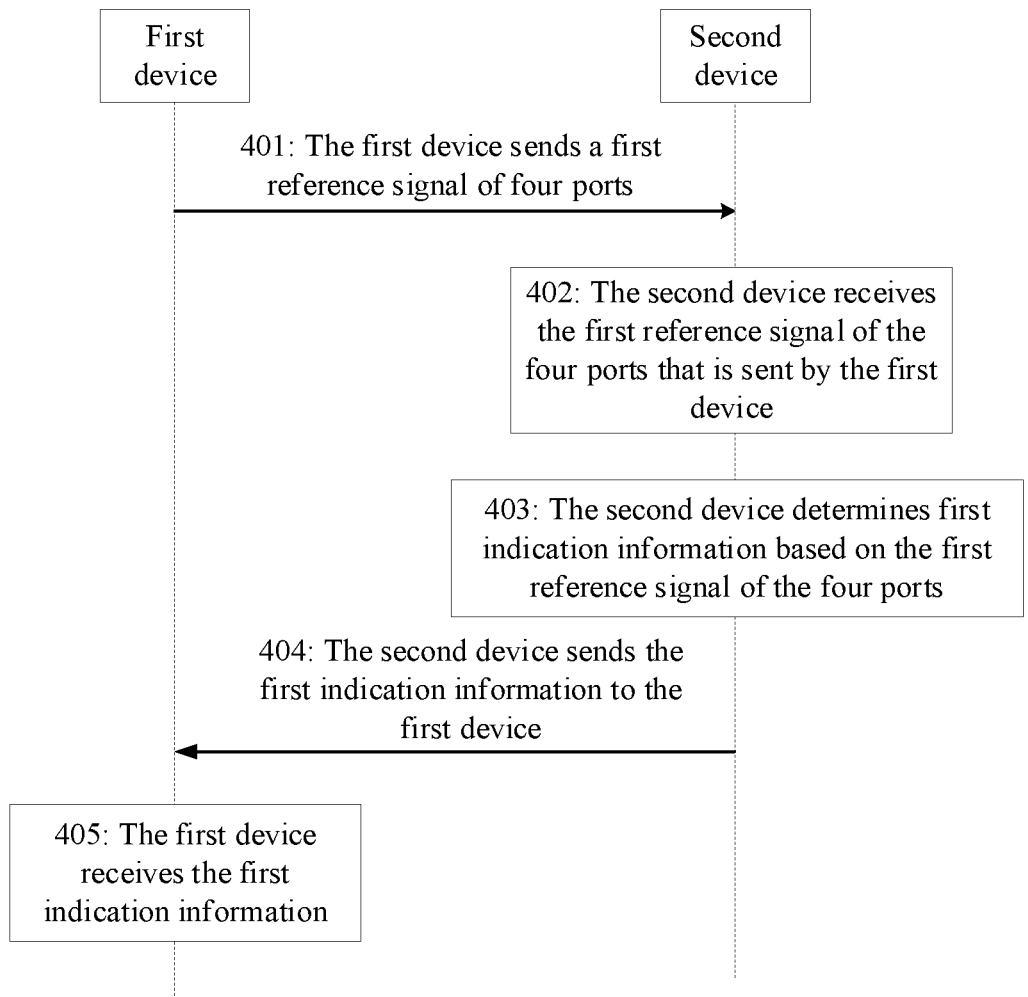
FIG. 4 is a flowchart of another communication method according to an embodiment of this application.

FIG. 4 is a flowchart of another communication method according to an embodiment of this application. The method may be applied to the communication system shown in FIG.

1. A first device may be the terminal device 102 in FIG. 1; and correspondingly, a second device may be the network device 101 in FIG. 1. As shown in FIG. 4, the method may include the following steps.

Step 401: The first device sends a first reference signal of four ports.

For example, the first reference signal may be an SRS signal; the four ports may be four SRS ports, and the four SRS ports correspond to four transmit antenna ports. A time-frequency location of the first reference signal of the four ports may be configured by the second device.

Step 402: The second device receives the first reference signal of the four ports that is sent by the first device.

For example, the second device may receive, on the corresponding time-frequency resource, the SRS sent by the first device.

Step 403: The second device determines first indication information based on the first reference signal of the four ports.

For example, the second device may measure the SRS to obtain an SRS measurement result. The SRS measurement result may be uplink channel information of the four transmit channels on carriers corresponding to the four transmit channels. The second device determines the first indication information based on the SRS measurement result.

The first indication information is used to indicate a first precoding matrix in a target codebook, and the first precoding matrix is associated with the first reference signal of four ports. The target codebook includes at least one target precoding matrix, and a quantity of rows in the target precoding matrix may be 4. In other words, the target codebook is a 4-port precoding codebook, for example, may be an extended 4-port precoding matrix table. The first precoding matrix indicated by the first indication information is at least one target precoding matrix in the 4-port precoding codebook.

To meet an uplink enhancement requirement for transmit channel resource pooling of a terminal device, this embodiment of this application provides a 4-port precoding codebook obtained after a 4-port codebook is extended. The extended 4-port precoding codebook includes a 2-port codebook of any 2-port combination and a 3-port codebook of any 3-port combination. Each carrier may indicate a codebook including one port, two ports, three ports, or four ports by using an extended 4-port TPMI.

For example, a quantity of SRS ports configured by the second device is 4, and a quantity of antenna ports to be scheduled for sending data (for example, a PUSCH) is 2. When a quantity of transmission layers is 1 or a quantity of transmission layers is 2 and a partially coherent precoding matrix is used, a 4-port precoding codebook needs to be extended, so that the 4-port precoding codebook includes a 2-port codebook of any 2-port combination. For example, there are four antenna ports 0 to 3 for the first device, the four SRS ports are configured for the second device, and two antenna ports need to be scheduled for sending data, for example, antenna ports 0 and 1. If a precoding matrix for layer 1 transmission and data sending is $$\frac{1}{\sqrt{2}}\begin{bmatrix}1\\1\end{bmatrix},$$

a 4-port layer 1 codebook should include $$\frac{1}{\sqrt{2}}\begin{bmatrix}1\\1\\0\\0\end{bmatrix};$$

or if a precoding matrix for layer 2 transmission and data sending is $$\frac{1}{2}\begin{bmatrix}1 & 1\\1 & -1\end{bmatrix},$$

a 4-port layer 2 codebook should include $$\frac{1}{2}\begin{bmatrix}1 & 1\\1 & -1\\0 & 0\\0 & 0\end{bmatrix}.$$

In some examples, in the extended 4-port precoding codebook, the target precoding matrix has two columns, the target precoding matrix has only two rows that include non-zero elements, and the target precoding matrix is a partially coherent precoding matrix. In this case, the target precoding matrix may be used to indicate the first device to perform precoding by using two of the four ports.

For example, non-zero rows (that is, two rows including non-zero elements) of the target precoding matrix are determined by [a4, b4; c4, d4], where a4, b4, c4, d4 are elements in $\{1/A_1, -1/A_1, j/A_1, -j/A_1\}$, j is an imaginary unit, and $A_1$ is a positive constant. The two rows in the target precoding matrix that include the non-zero elements each may have any row location. For example, any two columns in the target precoding matrix are orthogonal column vectors.

The target precoding matrix may be represented as $$\begin{bmatrix}a4 & b4\\c4 & d4\\0 & 0\\0 & 0\end{bmatrix}, \begin{bmatrix}a4 & b4\\0 & 0\\c4 & d4\\0 & 0\end{bmatrix}, \begin{bmatrix}a4 & b4\\0 & 0\\0 & 0\\c4 & d4\end{bmatrix}, \begin{bmatrix}0 & 0\\a4 & b4\\c4 & d4\\0 & 0\end{bmatrix}, \begin{bmatrix}0 & 0\\a4 & b4\\0 & 0\\c4 & d4\end{bmatrix}, \begin{bmatrix}0 & 0\\0 & 0\\a4 & b4\\c4 & d4\end{bmatrix},$$

where a4, b4, c4, and d4 are elements in $\{1/A_1, -1/A_1, j/A_1, -j/A_1\}$.

For example, when $A_1$ is 2, a4, b4, c4, and d4 are elements in $\{½, -½, j/2, -j/2\}$, and the target precoding matrix may be:

$$\frac{1}{2}\begin{bmatrix}1 & 1\\1 & -1\\0 & 0\\0 & 0\end{bmatrix}, \frac{1}{2}\begin{bmatrix}1 & 1\\0 & 0\\j & -j\\0 & 0\end{bmatrix}, \frac{1}{2}\begin{bmatrix}1 & 1\\0 & 0\\0 & 0\\1 & -1\end{bmatrix}, \frac{1}{2}\begin{bmatrix}0 & 0\\1 & 1\\j & -j\\0 & 0\end{bmatrix}, \frac{1}{2}\begin{bmatrix}0 & 0\\0 & 0\\1 & 1\\1 & -1\end{bmatrix}, \frac{1}{2}\begin{bmatrix}0 & 0\\0 & 0\\1 & 1\\j & -j\end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example, the quantity of SRS ports configured by the second device is 4, and the quantity of antenna ports to be scheduled for sending data (for example, a PUSCH) is 3. A 4-port precoding codebook needs to be extended, so that the 4-port precoding codebook includes a 3-port codebook of any 3-port combination. For example, the first device has four antenna ports 0 to 3, the quantity of SRS ports configured for the second device is 3 or 4, and the quantity of antenna ports to be scheduled for sending data is 3, for example, antenna ports 0, 1, and 3. If the precoding matrix for layer 1 transmission and data sending is $$\frac{1}{\sqrt{3}}\begin{bmatrix}1\\1\\1\end{bmatrix},$$

a 4-port layer 1 codebook should include $$\frac{1}{\sqrt{3}}\begin{bmatrix}1\\1\\0\\1\end{bmatrix};$$

if the precoding matrix for layer 2 transmission and data sending is $$\frac{1}{\sqrt{6}}\begin{bmatrix}1 & 1\\1 & -e^{j\pi/3}\\1 & e^{j2\pi/3}\end{bmatrix},$$

a 4-port layer 2 codebook should include $$\frac{1}{\sqrt{6}}\begin{bmatrix}1 & 1\\1 & -e^{j\pi/3}\\0 & 0\\1 & e^{j2\pi/3}\end{bmatrix};$$

or if the precoding matrix for layer 3 transmission and data sending is $$\frac{1}{3}\begin{bmatrix}1 & 1 & 1\\1 & -e^{j\pi/3} & e^{j\pi/3}\\1 & e^{j2\pi/3} & e^{j2\pi/3}\end{bmatrix},$$

a 4-port layer 3 codebook should include $$\frac{1}{3}\begin{bmatrix}1 & 1 & 1\\1 & -e^{j\pi/3} & e^{j\pi/3}\\0 & 0 & 0\\1 & e^{j2\pi/3} & e^{j2\pi/3}\end{bmatrix}.$$

In some examples, in the extended 4-port precoding codebook, only three rows in the target precoding matrix include non-zero elements, and the target precoding matrix is a partially coherent precoding matrix. In this case, the target precoding matrix may be used to indicate the first device to perform precoding by using three of the four ports.

For example, the non-zero element in the target precoding matrix is an element in $\{1/A_2, e^{j\pi/3}/A_2, e^{j2\pi/3}/A_2, -1/A_2, -e^{j2\pi/3}/A_2, -e^{j\pi/3}/A_2\}$, where j is an imaginary unit, and $A_2$ is a positive constant. The three rows in the target precoding matrix that include the non-zero elements each may have any row location. For example, any two columns in the target precoding matrix are orthogonal column vectors.

In the 4-port precoding codebook, when the quantity of columns in the target precoding matrix is 2, the target precoding matrix may be represented as $$\begin{bmatrix}a5 & b5\\c5 & d5\\e5 & f5\\0 & 0\end{bmatrix}, \begin{bmatrix}a5 & b5\\c5 & d5\\0 & 0\\e5 & f5\end{bmatrix}, \begin{bmatrix}a5 & b5\\0 & 0\\c5 & d5\\e5 & f5\end{bmatrix}, \begin{bmatrix}0 & 0\\a5 & b5\\c5 & d5\\e5 & f5\end{bmatrix},$$

where at least one of a5 and b5 is a non-zero element, at least one of c5 and d5 is a non-zero element, and at least one of e5 and f5 is a non-zero element. When any one of a5, b5, c5, d5, e5 and f5 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

For example when $A_2$ is $\sqrt{3}$, that is, the non-zero element is an element in $$\{1/\sqrt{3}, e^{\frac{j\pi}{3}}/\sqrt{3}, e^{\frac{j2\pi}{3}}/\sqrt{3}, -1/\sqrt{3}, -e^{\frac{j2\pi}{3}}/\sqrt{3}, -e^{\frac{j\pi}{3}}/\sqrt{3}\},$$

the target precoding matrix may be:

$$\frac{1}{\sqrt{3}}\begin{bmatrix}1 & 0\\1 & 0\\0 & 1\\0 & 0\end{bmatrix}, \frac{1}{\sqrt{3}}\begin{bmatrix}1 & 0\\0 & 1\\1 & 0\\0 & 0\end{bmatrix}, \frac{1}{\sqrt{3}}\begin{bmatrix}0 & 1\\1 & 0\\1 & 0\\0 & 0\end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example when $A_2$ is V, that is, the non-zero element is an element in $$\{1/\sqrt{6}, e^{\frac{j\pi}{3}}/\sqrt{6}, e^{\frac{j2\pi}{3}}/\sqrt{6}, -1/\sqrt{6}, -e^{\frac{j2\pi}{3}}/\sqrt{6}, -e^{\frac{j\pi}{3}}/\sqrt{6}\},$$

the target precoding matrix may be:

$$\frac{1}{\sqrt{6}}\begin{bmatrix}1 & 1\\1 & -e^{j\pi/3}\\1 & e^{j2\pi/3}\\0 & 0\end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

In the 4-port precoding codebook, when the quantity of columns in the target precoding matrix is 3, the target precoding matrix may be represented as $$\begin{bmatrix} a6 & b6 & c6 \\ 0 & 0 & 0 \\ d6 & e6 & f6 \\ g6 & h6 & k6 \end{bmatrix}, \begin{bmatrix} a6 & b6 & c6 \\ d6 & e6 & f6 \\ 0 & 0 & 0 \\ g6 & h6 & k6 \end{bmatrix}, \begin{bmatrix} a6 & b6 & c6 \\ d6 & e6 & f6 \\ g6 & h6 & k6 \\ 0 & 0 & 0 \end{bmatrix}, \begin{bmatrix} 0 & 0 & 0 \\ a6 & b6 & c \\ d6 & e6 & f6 \\ g6 & h6 & k6 \end{bmatrix},$$

whereat least one of a6, b6, and c6 is a non-zero element, at least one of d6, e6, and f6 is a non-zero element, and at least one of g6, h6, and k6 is a non-zero element. When any one of a6, b6, c6, d6, e6, f6, g6, h6, and k6 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

For example when $A_2$ is $\sqrt{6}$, that is, the non-zero element is an element in $$\left\{1/\sqrt{3}, e^{\frac{j\pi}{3}}/\sqrt{3}, e^{\frac{j2\pi}{3}}/\sqrt{3}, -1/\sqrt{3}, -e^{\frac{j2\pi}{3}}/\sqrt{3}, -e^{\frac{j\pi}{3}}/\sqrt{3}\right\},$$

the target precoding matrix may be:

$$\frac{1}{\sqrt{3}}\begin{bmatrix} 1 & 0 & 0 \\ 0 & 0 & 0 \\ 0 & 1 & 0 \\ 0 & 0 & 1 \end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example, when $A_2$ is $\sqrt{6}$, that is, the non-zero element is an element in $$\left\{1/\sqrt{6}, e^{\frac{j\pi}{3}}/\sqrt{6}, e^{\frac{j2\pi}{3}}/\sqrt{6}, -1/\sqrt{6}, -e^{\frac{j2\pi}{3}}/\sqrt{6}, -e^{\frac{j\pi}{3}}/\sqrt{6}\right\},$$

the target precoding matrix may be:

$$\frac{1}{\sqrt{6}}\begin{bmatrix} 1 & 1 & 0 \\ 1 & -1 & 0 \\ 0 & 0 & 0 \\ 0 & 0 & 1 \end{bmatrix}, \frac{1}{\sqrt{6}}\begin{bmatrix} 1 & 1 & 0 \\ 1 & -1 & 0 \\ 0 & 0 & 0 \\ 0 & 0 & -1 \end{bmatrix},$$

or the like.

It may be understood that the listed target precoding matrices are merely examples, and are not exhaustive; any two columns in the listed target precoding matrices are orthogonal column vectors; and the listed target precoding matrices are partially coherent precoding matrices.

For example, when $A_2$ is 3, that is, the non-zero element is an element in $$\left\{1/3, e^{\frac{j\pi}{3}}/3, e^{\frac{j2\pi}{3}}/3, -1/3, -e^{\frac{j2\pi}{3}}/3, -e^{\frac{j\pi}{3}}/3\right\},$$

the target precoding matrix may be:

$$\frac{1}{3}\begin{bmatrix} 1 & 1 & 1 \\ 1 & -e^{j\pi/3} & e^{j\pi/3} \\ 1 & e^{j2\pi/3} & e^{j2\pi/3} \\ 0 & 0 & 0 \end{bmatrix},$$

or the like.

It may be understood that the listed target precoding matrices are merely examples, and are not exhaustive; and the listed target precoding matrices are partially coherent precoding matrices.

For example, the target codebook is an extended 4-port precoding matrix table, as shown in Table 11 to Table 13 below. W represent precoding matrices, each row in each target precoding matrix corresponds to one transmit antenna port, and each column corresponds to one transmission layer; and one TPMI index corresponds to one target precoding matrix.

TABLE 11

Extended precoding matrix table for layer 1 transmission using four antenna ports

| TPMI index | W | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-31 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | $\frac{1}{\sqrt{2}}\begin{bmatrix}1\\1\\0\\0\end{bmatrix}$ | $\frac{1}{\sqrt{2}}\begin{bmatrix}1\\-1\\0\\0\end{bmatrix}$ | $\frac{1}{\sqrt{2}}\begin{bmatrix}1\\j\\0\\0\end{bmatrix}$ | $\frac{1}{\sqrt{2}}\begin{bmatrix}1\\-j\\0\\0\end{bmatrix}$ |

TABLE 11-continued

Extended precoding matrix table for layer 1 transmission using four antenna ports

| TPMI index | W |
|---|---|
| 32-39 | $\frac{1}{\sqrt{2}}\begin{bmatrix}1\\0\\0\\1\end{bmatrix}$ $\frac{1}{\sqrt{2}}\begin{bmatrix}1\\0\\0\\-1\end{bmatrix}$ $\frac{1}{\sqrt{2}}\begin{bmatrix}1\\0\\0\\j\end{bmatrix}$ $\frac{1}{\sqrt{2}}\begin{bmatrix}1\\0\\0\\-j\end{bmatrix}$ $\frac{1}{\sqrt{2}}\begin{bmatrix}0\\1\\1\\0\end{bmatrix}$ $\frac{1}{\sqrt{2}}\begin{bmatrix}0\\1\\-1\\0\end{bmatrix}$ $\frac{1}{\sqrt{2}}\begin{bmatrix}0\\1\\j\\0\end{bmatrix}$ $\frac{1}{\sqrt{2}}\begin{bmatrix}0\\1\\-j\\0\end{bmatrix}$ |
| 40-~ | $\frac{1}{\sqrt{2}}\begin{bmatrix}0\\0\\1\\1\end{bmatrix}$ $\frac{1}{\sqrt{2}}\begin{bmatrix}0\\0\\1\\-1\end{bmatrix}$ $\frac{1}{\sqrt{2}}\begin{bmatrix}0\\0\\1\\j\end{bmatrix}$ $\frac{1}{\sqrt{2}}\begin{bmatrix}0\\0\\1\\-j\end{bmatrix}$ $\frac{1}{\sqrt{3}}\begin{bmatrix}1\\a0\\b0\\0\end{bmatrix}$ $\frac{1}{\sqrt{3}}\begin{bmatrix}1\\a0\\0\\b0\end{bmatrix}$ $\frac{1}{\sqrt{3}}\begin{bmatrix}1\\0\\a0\\b0\end{bmatrix}$ $\frac{1}{\sqrt{3}}\begin{bmatrix}0\\1\\a0\\b0\end{bmatrix}$ |

The codebook in Table 11 includes an extended precoding matrix table for layer 1 transmission using four antenna ports. In the table, precoding matrices whose indexes are 28 to 43 are extended when one layer of data is actually transmitted by using two antenna ports, so that locations of two antenna ports actually used by the data are not limited. The last four matrices in the table are example target precoding matrices when the quantity of antenna ports to be scheduled for sending data is 3 and the quantity of transmission layers is 1, where values of a0 and b0 may be $\{1, e^{j\pi/3}, e^{j2\pi/3}, -1, -e^{j2\pi/3}, -e^{j\pi/3}\}$.

TABLE 12

Extended precoding matrix table for layer 2 transmission using four antenna ports

| TPMI index | W |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16-19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20-23 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ $\frac{1}{2}\begin{bmatrix}1&1\\1&-1\\0&0\\0&0\end{bmatrix}$ $\frac{1}{2}\begin{bmatrix}1&1\\j&-j\\0&0\\0&0\end{bmatrix}$ |
| 24-27 | $\frac{1}{2}\begin{bmatrix}1&1\\0&0\\1&-1\\0&0\end{bmatrix}$ $\frac{1}{2}\begin{bmatrix}1&1\\0&0\\j&-j\\0&0\end{bmatrix}$ $\frac{1}{2}\begin{bmatrix}1&1\\0&0\\0&0\\1&-1\end{bmatrix}$ $\frac{1}{2}\begin{bmatrix}1&1\\0&0\\0&0\\j&-j\end{bmatrix}$ |
| 28-31 | $\frac{1}{2}\begin{bmatrix}0&0\\1&1\\1&-1\\0&0\end{bmatrix}$ $\frac{1}{2}\begin{bmatrix}0&0\\1&1\\j&-j\\0&0\end{bmatrix}$ $\frac{1}{2}\begin{bmatrix}0&0\\1&1\\0&0\\1&-1\end{bmatrix}$ $\frac{1}{2}\begin{bmatrix}0&0\\1&1\\0&0\\j&-j\end{bmatrix}$ |

TABLE 12-continued

Extended precoding matrix table for layer 2 transmission using four antenna ports

| TPMI index | W | | | |
|---|---|---|---|---|
| 32-35 | $\frac{1}{2}\begin{bmatrix} 0 & 0 \\ 0 & 0 \\ 1 & 1 \\ 1 & -1 \end{bmatrix}$ | $\frac{1}{2}\begin{bmatrix} 0 & 0 \\ 0 & 0 \\ 1 & 1 \\ j & -j \end{bmatrix}$ | $\begin{bmatrix} a5 & b5 \\ c5 & d5 \\ e5 & f5 \\ 0 & 0 \end{bmatrix}$ | $\begin{bmatrix} a5 & b5 \\ c5 & d5 \\ 0 & 0 \\ e5 & f5 \end{bmatrix}$ |
| 36-~ | $\begin{bmatrix} a5 & b5 \\ 0 & 0 \\ c5 & d5 \\ e5 & f5 \end{bmatrix}$ | $\begin{bmatrix} 0 & 0 \\ a5 & b5 \\ c5 & d5 \\ e5 & f5 \end{bmatrix}$ | | |

The codebook in Table 12 includes a target precoding matrix for layer 2 transmission using four antenna ports. The precoding matrices whose indexes are 22 to 33 in the table are extensions during actual use of layer 2 data transmission using two antenna ports, so that a location of an antenna port used for sending data is not limited, and the two antenna ports that are actually used can be used for coherent precoding. The last four matrices in the table are example target precoding matrices when the quantity of actually used antenna ports to be scheduled for sending data is 3 and the quantity of transmission layers is 2, where at least one of a5 and b5 is a non-zero element, at least one of c5 and d5 is a non-zero element, and at least one of e5 and f5 is a non-zero element. When a5, b5, c5, d5, e5, or f5 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

TABLE 13

Extended precoding matrix table for layer 3 transmission using four antenna ports

| TPMI index | W | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-7 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | $\begin{bmatrix} a6 & b6 & c6 \\ 0 & 0 & 0 \\ d6 & e6 & f6 \\ g6 & h6 & k6 \end{bmatrix}$ |
| 8-~ | $\begin{bmatrix} a6 & b6 & c6 \\ d6 & e6 & f6 \\ 0 & 0 & 0 \\ g6 & h6 & k6 \end{bmatrix}$ | $\begin{bmatrix} a6 & b6 & c6 \\ d6 & e6 & f6 \\ g6 & h6 & k6 \\ 0 & 0 & 0 \end{bmatrix}$ | $\begin{bmatrix} 0 & 0 & 0 \\ a6 & b6 & c \\ d6 & e6 & f6 \\ g6 & h6 & k6 \end{bmatrix}$ | |

The codebook in Table 13 includes a target precoding matrix for layer 3 transmission using four antenna ports. The last four matrices in the table are examples of precoding matrices when a quantity of actually used antenna ports to be scheduled for sending data is 3 and a quantity of transmission layers is 3. At least one of a6, b6, and c6 is a non-zero element, at least one of d6, e6, and f6 is a non-zero element, and at least one of g6, h6, and k6 is a non-zero element. When any one of a6, b6, c6, d6, e6, f6, g6, h6 and k6 is a non-zero element, the non-zero element is an element in $\{1/A_2, e^{j\pi/3}/A_2, e^{j2\pi/3}/A_2, -1/A_2, -e^{j2\pi/3}/A_2, -e^{j\pi/3}/A_2\}$.

It should be noted that forms of the target precoding matrices in Table 11 to Table 13 and index values corresponding to the target precoding matrices are merely examples. This is not limited in this embodiment of this application. In this embodiment of this application, a waveform to which the target precoding matrix table is applicable is not limited.

For example, any two columns in the target precoding matrix in Table 12 and Table 13 are orthogonal column vectors.

In a possible implementation, the first indication information includes indication information of a first TPMI and/or indication information of a quantity of precoding layers. For example, the second device determines, based on the SRS measurement result, that the first precoding matrix is $$\frac{1}{2}\begin{bmatrix} 1 & 0 & 0 \\ 0 & 1 & 0 \\ -1 & 0 & 0 \\ 0 & 0 & 1 \end{bmatrix},$$

and determines that the quantity of precoding layers of the first precoding matrix is 3. In this case, a codebook for layer 3 transmission using four ports (that is, the precoding matrix table shown in Table 13) is the target codebook, and the index value of the first precoding matrix $$\frac{1}{2}\begin{bmatrix} 1 & 0 & 0 \\ 0 & 1 & 0 \\ -1 & 0 & 0 \\ 0 & 0 & 1 \end{bmatrix}$$

in the target precoding matrix table shown in Table 13 is 2, and then it is determined that the first TPMI is 2.

Step 404: The second device sends the first indication information to the first device.

In this step, the second device may send, to the first device, the indication information indicating the first TPMI and/or the quantity of precoding layers. For example, one field may be sent to jointly indicate that the first TPMI is 2 and the quantity of precoding layers is 3; or two fields may be sent, where one field indicates that the first TPMI is 2, and the other field indicates that the quantity of precoding layers is 3.

Step 405: The first device receives the first indication information.

For example, the first device may receive the indication information indicating the first TPMI and/or the quantity of precoding layers. Further, the first device may determine, based on the four SRS ports in the SRS resource configuration, that the quantity of transmit antenna ports is 4, then determine a target codebook (for example, a precoding matrix table) based on the four transmit antenna ports and the quantity of precoding layers, and finally determine the first precoding matrix in the precoding matrix table by using the first TPMI. For example, the first indication information indicates that the quantity of precoding layers is 3, and the index value indicated by the first TPMI is 2. A codebook for layer 3 transmission using four ports (as shown in Table 13) may be searched, to determine that the first precoding matrix corresponding to the index value 2 is $$\frac{1}{2}\begin{bmatrix} 1 & 0 & 0 \\ 0 & 1 & 0 \\ -1 & 0 & 0 \\ 0 & 0 & 1 \end{bmatrix}.$$

In this embodiment of this application, for an uplink enhancement solution of transmit channel resource pooling of a terminal device, a 4-port codebook is extended, so that the 4-port codebook includes a 2-port codebook of any 2-port combination and a 3-port codebook of any 3-port combination. The first indication information is used to indicate a first precoding matrix in the extended 4-port codebook. In this way, each carrier indicates a 2-port, 3-port, or 4-port codebook by using an extended 4-port TPMI, so that uplink transmission on a maximum of three transmit channels on a same carrier can be supported. In this way, the maximum degree of freedom of resource pooling of uplink transmit channels is ensured, and uplink transmission performance is improved.

Figure 5:
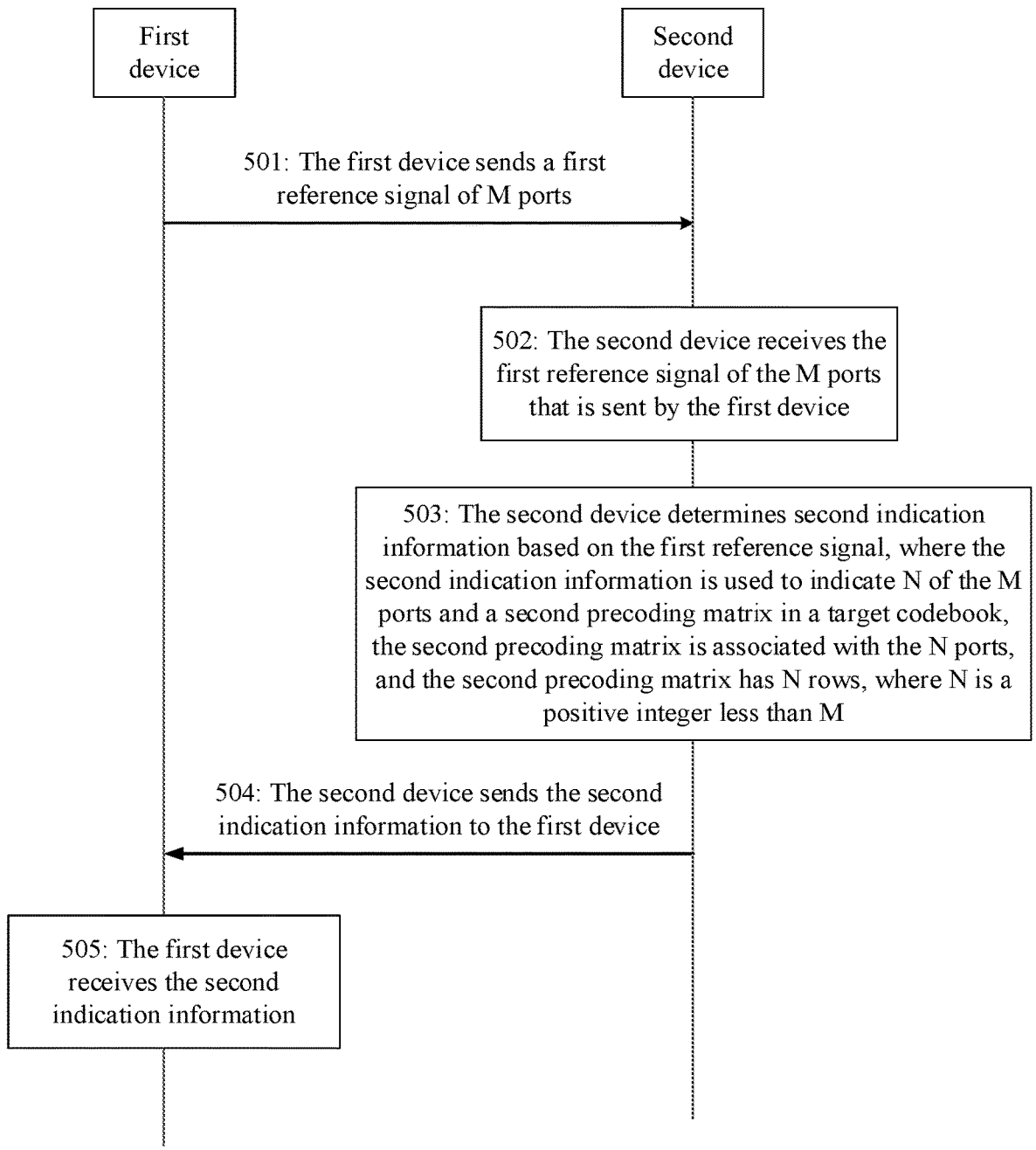
FIG. 5 is a flowchart of another communication method according to an embodiment of this application.

FIG. 5 is a flowchart of another communication method according to an embodiment of this application. The method may be applied to the communication system shown in FIG. 1. A first device may be the terminal device 102 in FIG. 1; and correspondingly, a second device may be the network device 101 in FIG. 1. As shown in FIG. 5, the method may include the following steps.

Step 501: The first device sends a first reference signal of M ports, where M is an integer greater than 2.

For example, the first reference signal may be an SRS, and the M ports may be M SRS ports. The M SRS ports are in a one-to-one correspondence with the M transmit antenna ports. The first device may send the SRS on a corresponding time-frequency resource based on the SRS resource configuration. The time-frequency location of the first reference signal may be configured by the second device.

Step 502: The second device receives the first reference signal of the M ports that is sent by the first device.

For example, the second device may receive, on the corresponding time-frequency resource, the SRS sent by the first device.

Step 503: The second device determines second indication information based on the first reference signal of the M ports.

For example, the second device may measure the SRS to obtain an SRS measurement result. The SRS measurement result may be uplink channel information of each transmit channel on a carrier corresponding to the transmit channel. The second device determines the second indication information based on the SRS measurement result.

The second indication information is used to indicate N of the M ports and a second precoding matrix in the target codebook, the second precoding matrix is associated with the N ports, a quantity of rows in the second precoding matrix is N, and N is a positive integer less than M. For example, the second precoding matrix is associated with the N SRS ports, that is, the second precoding matrix is located in the target codebook corresponding to the N SRS ports. The N ports are associated with antenna ports that are actually used by the first device to send data.

The target codebook includes at least one target precoding matrix, a quantity of rows in the target precoding matrix may be N, and the target precoding matrix does not include a row in which all elements are 0. The second precoding matrix indicated by the second indication information is at least one target precoding matrix in the precoding codebook of the N ports. A non-zero element included in the target precoding matrix is an element in $\{e^{jn\pi/N}/A\}$, where n=0, 1, 2, ..., N−1, j is an imaginary unit, and A is a positive constant.

For example, when the quantity of columns in the target precoding matrix is greater than 1, any two columns in the target precoding matrix are orthogonal column vectors.

For example, a waveform to which the target precoding matrix is applicable may include a DFT-s-OFDM waveform, a CP-OFDM waveform, or another waveform. For example, a DFT-s-OFDM waveform may be used in a power-limited scenario, and the waveform supports data transmission with a maximum of a single flow, and a single carrier feature is ensured. A cyclic prefix CP-OFDM waveform may be used in a resource-limited scenario, and the waveform supports single-flow or multi-flow data transmission, to improve spectral efficiency of a communication system.

In a possible implementation, the second indication information may include indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port 0f the M ports of the first reference signal is used.

In a possible implementation, the second indication information may include indication information of a port indication vector, the port indication vector is used to indicate N of the M ports, and an $i^{th}$ element in the port indication vector represents one of the M ports of the first reference signal corresponding to an $i^{th}$ row in the second precoding matrix.

In a possible implementation, the second indication information may further include indication information of a quantity of precoding layers and/or indication information of a second TPMI, where the quantity of precoding layers is used to determine a target codebook (for example, a precoding matrix table), and the second TPMI is an index of the second precoding matrix in the target codebook. Optionally, the quantity of precoding layers and the second TPMI may be carried in a same field or different fields.

Step 504: The second device sends second indication information to the first device.

For example, the second device may send, to the first device, the indication information indicating the second TPMI, the precoding layer quantity, and the port bitmap. Optionally, the second TPMI, the precoding layer quantity, and the port bitmap may be carried in a same field. Alternatively, the second device may send, to the first device, the indication information indicating the second TPMI, the precoding layer quantity, and the port indication vector. Optionally, the second TPMI, the precoding layer quantity, and the port indication vector may be carried in a same field. For example, a precoding information and a quantity of precoding layers field in the DCI may be used to indicate the first TPMI, the quantity of precoding layers, and the port indication vector. For example, the field may occupy eight bits, and different bit values of the eight bits indicate the second TPMI, the quantity of precoding layers, and the port indication vector. For example, 00000000 indicates that the second TPMI is 0, the quantity of precoding layers is 1, and the port indication vector is $$\begin{bmatrix}1\\2\end{bmatrix};$$

and 00011001 indicates that the first TPMI is 2, the quantity of precoding layers is 3, and the port indication vector is $$\begin{bmatrix}0\\1\\2\end{bmatrix}.$$

Step 505: The first device receives the second indication information.

For example, the first device may receive the indication information indicating the second TPMI, the quantity of precoding layers, and the port bitmap. Further, the first device may determine the precoding matrix table based on the port bitmap and the quantity of precoding layers, determine, based on the second TPMI, the second precoding matrix in the precoding matrix table, and determine, based on the port bitmap, the transmit antenna port corresponding to each row in the second precoding matrix.

For example, the first device may receive the indication information indicating the second TPMI, the quantity of precoding layers, and the port indication vector. Further, the first device may determine the precoding matrix table based on the port indication vector and the quantity of precoding layers, determine, based on the second TPMI, the second precoding matrix in the precoding matrix table, and determine, based on the port indication vector, the transmit antenna port corresponding to each row in the second precoding matrix.

In this embodiment of this application, when the quantity M of reference signal ports configured by the second device for the first device is greater than N, the second device schedules, based on the reference signal measurement result, N antenna ports for the first device to send data, and performs TPMI indication by using a codebook corresponding to the quantity of antenna ports. In addition, an indication of "antenna port selection" is added, so that the TPMI-based indication method meets the requirement for transmit channel resource pooling, thereby ensuring a maximum degree of freedom of uplink transmit channel resource pooling, and improving uplink transmission performance.

The following describes the communication method in FIG. 5 by using an example in which N is 3.

Figure 6:
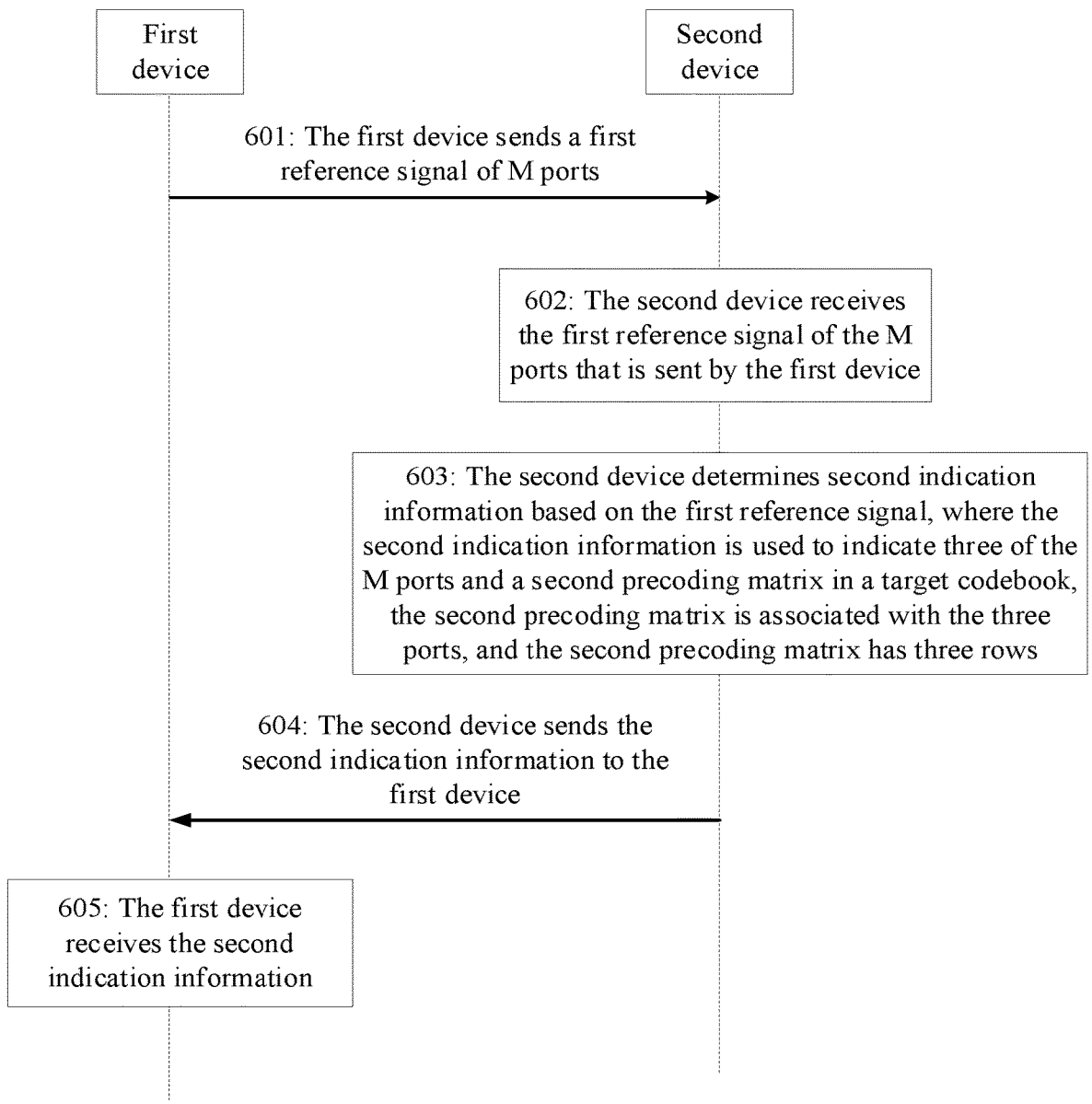
FIG. 6 is a flowchart of another communication method according to an embodiment of this application.

FIG. 6 is a flowchart of another communication method according to an embodiment of this application. The method may be applied to the communication system shown in FIG. 1. A first device may be the terminal device 102 in FIG. 1; and correspondingly, a second device may be the network device 101 in FIG. 1. As shown in FIG. 6, the method may include the following steps.

Step 601: The first device sends a first reference signal of M ports, where M is an integer greater than 2. Step 602: The second device receives the first reference signal of the M ports that is sent by the first device.

Step 603: The second device determines second indication information based on the first reference signal.

The second indication information is used to indicate three of the M ports and a second precoding matrix in a target codebook, and a quantity of rows in the second precoding matrix is 3. The second precoding matrix is associated with the three ports, and the three ports are associated with antenna ports actually used by the first device to send data.

The target codebook includes at least one target precoding matrix, a quantity of rows in the target precoding matrix is 3, and the target precoding matrix does not include a row in which all elements are 0. The second precoding matrix indicated by the second indication information is at least one of the target precoding matrices in the target codebook. A non-zero element included in the target precoding matrix is an element in $\{e^{jn\pi/3}/A\}$, where n=0, 1, 2, j is an imaginary unit, and A is a positive constant.

For example, when the quantity of columns in the target precoding matrix is greater than 1, any two columns in the target precoding matrix are orthogonal column vectors.

For example, when M=4, that is, the first reference signal is a first reference signal of four ports, the target codebook may be a 3-port codebook shown in Table 8 to Table 10.

In a possible implementation, the second indication information may include indication information of a port bitmap, and the port bitmap is used to indicate three of the M ports.

For example, when M=4, the second device configures four SRS ports 0 to 3 for the first device. It is assumed that when the first device sends the SRS, the four SRS ports are respectively associated with four antenna ports of the first device. The second device schedules, based on an SRS measurement result, the antenna ports corresponding to three SRS ports 0, 1, and 2 for the first device to send data. The second device indicates antenna port selection by using a port bitmap. For example, the port bitmap [1,1,1,0] indicates that antenna ports associated with the three SRS ports 0, 1, and 2 are selected, and the three antenna ports are antenna ports used for sending data; the first row in the precoding matrix corresponds to the SRS port 0, the second row in the precoding matrix corresponds to the SRS port 1, and the third row in the precoding matrix corresponds to the SRS port 2; and the first row in the precoding matrix corresponds to the antenna port associated with the SRS port 0, the second row in the precoding matrix corresponds to the antenna port associated with the SRS port 1, and the third row in the precoding matrix corresponds to the antenna port associated with the SRS port 2.

In a possible implementation, the second indication information may include indication information of a port indication vector, the port indication vector indicates three of the M ports, and an $i^{th}$ element in the port indication vector indicates one of the M ports of the first reference signal corresponding to an $i^{th}$ row in the first precoding matrix.

For example, when M=4, the second device configures four SRS ports 0 to 3 for the first device. It is assumed that when the first device sends the SRS, the four SRS ports respectively correspond to four antenna ports of the first device. The second device schedules, based on the SRS measurement result, the antenna ports corresponding to three SRS ports 0, 1, and 2 for the first device to send data. Selection of an antenna port is indicated by using a port indication vector. For example, the port indication vector $$\begin{bmatrix}0\\1\\2\end{bmatrix}$$

indicates that antenna ports associated with the three SRS ports 0, 1, and 2 are selected, and the three antenna ports are antenna ports used for sending data; the first row in the precoding matrix corresponds to the SRS port 0, the second row in the precoding matrix corresponds to the SRS port 1, and the third row in the precoding matrix corresponds to the SRS port 2; and the first row in the precoding matrix corresponds to the antenna port associated with the SRS port 0, the second row in the precoding matrix corresponds to the antenna port associated with the SRS port 1, and the third row in the precoding matrix corresponds to the antenna port associated with the SRS port 2.

In a possible implementation, the second indication information may further include indication information of a second TPMI and/or indication information of a quantity of precoding layers, where the quantity of precoding layers is used to determine a target codebook, and the second TPMI is an index of the second precoding matrix in the target codebook. For example, when M=4, the second precoding matrix determined by the second device is $$\frac{1}{\sqrt{3}}\begin{bmatrix}1\\1\\1\end{bmatrix},$$

the quantity of precoding layers is 1, and it is determined, based on the codebook for layer 1 transmission using three ports in Table 8, that the second TPMI is 15.

Step 604: The second device sends second indication information to the first device.

For example, the second device may send, to the first device, information indicating the second TPMI, the quantity of precoding layers, and the port bitmap. For example, when M=4, the second precoding matrix is $$\frac{1}{\sqrt{3}}\begin{bmatrix}1\\1\\1\end{bmatrix},$$

and three antenna ports associated with the SRS ports 0, 1, and 2 are selected as antenna ports, the quantity of precoding layers is 1, the index value of the second TPMI is 15, and the port bitmap is [1,1,1,0].

For example, the second device may send, to the first device, information indicating the second TPMI, the quantity of precoding layers, and the port indication vector. For example, when M=4, the second precoding matrix is $$\frac{1}{\sqrt{3}}\begin{bmatrix}1\\1\\1\end{bmatrix},$$

and three antenna ports associated with the SRS ports 0, 1, and 2 are selected as antenna ports, the quantity of precoding layers is 1, the index value of the second TPMI is 15, and the port indication vector is [0,1,2]

Step 605: The first device receives the second indication information.

For example, the first device may receive the information indicating the second TPMI, the quantity of precoding layers, and the port bitmap, or receive the information indicating the second TPMI, the quantity of precoding layers, and the port indication vector. Further, the first device may search for the second precoding matrix based on the quantity of precoding layers and the second TPMI, and determine three of the M ports based on the port bitmap or the port indication vector.

For example, when M=4, the second indication information indicates that the quantity of precoding layers is 2, the index value of the second TPMI is 15, and the port indication vector is $$\begin{bmatrix}0\\1\\2\end{bmatrix}.$$

The first device determines, based on the quantity 2 of precoding layers and the indication vector $$\begin{bmatrix}0\\1\\2\end{bmatrix},$$

that the precoding matrix table is a precoding matrix for layer 2 transmission using three antenna ports, that is, Table 9; determines, based on the index value 15 of the second TPMI, that the second precoding matrix is $$\frac{1}{\sqrt{3}}\begin{bmatrix}1\\1\\1\end{bmatrix};$$

and determines, based on the port indication vector $$\begin{bmatrix} 0 \\ 1 \\ 2 \end{bmatrix},$$

that the first row in $$\frac{1}{\sqrt{3}}\begin{bmatrix} 1 \\ 1 \\ 1 \end{bmatrix}$$

corresponds to the antenna port associated with the SRS port 0, the second row corresponds to the antenna port associated with the SRS port 1, and the third row corresponds to the antenna port associated with the SRS port 2.

For specific content of the steps in FIG. 6, refer to related descriptions in FIG. 5. Details are not described herein again.

In this embodiment of this application, when the quantity M of reference signal ports configured by the second device for the first device is greater than 3, the second device schedules, based on the reference signal measurement result, three antenna ports for the first device to send data, and performs TPMI indication by using a codebook corresponding to the quantity of antenna ports. In addition, an indication of "antenna port selection" is added, so that the TPMI-based indication method meets the requirement for transmit channel resource pooling, thereby ensuring a maximum degree of freedom of uplink transmit channel resource pooling, and improving uplink transmission performance.

The following describes the communication method in FIG. 5 by using an example in which N is 2.

Figure 7:
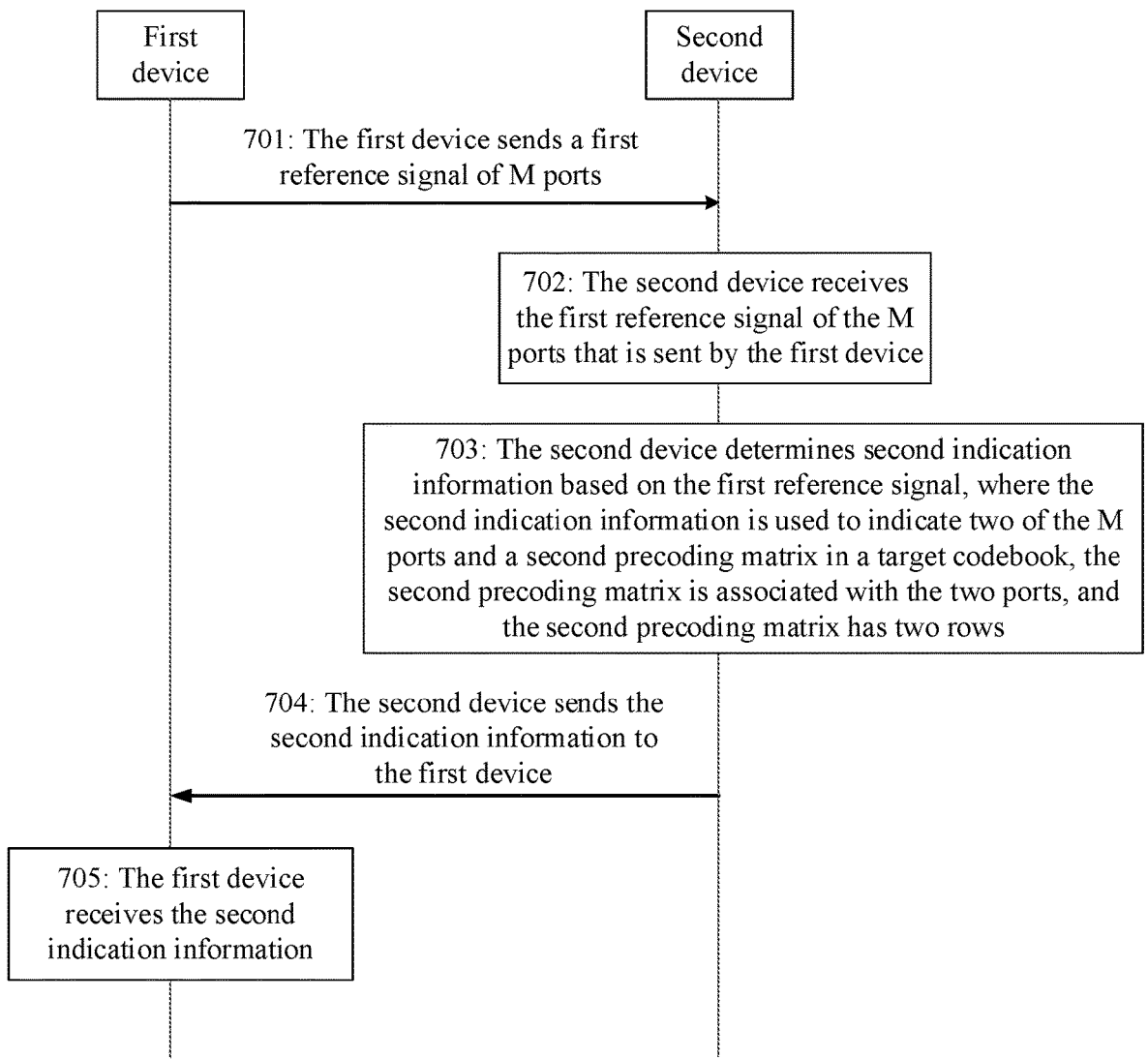
FIG. 7 is a flowchart of another communication method according to an embodiment of this application.

FIG. 7 is a flowchart of a communication method according to an embodiment of this application. The method may be applied to the communication system shown in FIG. 1. A first device may be the terminal device 102 in FIG. 1; and correspondingly, a second device may be the network device 101 in FIG. 1. As shown in FIG. 7, the method may include the following steps.

Step 701: The first device sends a first reference signal of M ports, where M is an integer greater than 2.

Step 702: The second device receives the first reference signal of the M ports that is sent by the first device.

Step 703: The second device determines second indication information based on the first reference signal.

The second indication information is used to indicate two of the M ports and a second precoding matrix in a target codebook, and a quantity of rows in the second precoding matrix is 2. The second precoding matrix is associated with the two ports, and the two ports are associated with antenna ports actually used by the first device to send data.

The target codebook includes at least one target precoding matrix, a quantity of rows in the target precoding matrix may be 2, and the target precoding matrix does not include a row in which all elements are 0. The second precoding matrix indicated by the second indication information is at least one of the target precoding matrices in the target codebook. A non-zero element included in the target precoding matrix is an element in $\{e^{jn\pi/2}/A\}$, where n=0, 1, j is an imaginary unit, and A is a positive constant.

For example, when the quantity of columns in the target precoding matrix is greater than 1, any two columns in the target precoding matrix are orthogonal column vectors.

For example, when M=4 or M=3, that is, when the first reference signal is a first reference signal of four ports, the target codebook may be a 2-port codebook shown in Table 1 and Table 2. Details are not described herein again.

In a possible implementation, the second indication information may include a port bitmap, and the port bitmap is used to indicate two of the M ports.

For example, when M=3, the second device configures three SRS ports 0 to 2 for the first device. It is assumed that when the first device sends the SRS, the three SRS ports are respectively associated with three antenna ports of the first device. The second device schedules, based on an SRS measurement result, the antenna ports corresponding to two SRS ports 0 and 1 for the first device to send data. The second device indicates antenna port selection by using a port bitmap. For example, the port bitmap [1,1,0] indicates that antenna ports associated with the two SRS ports 0 and 1 are selected, and the two antenna ports are antenna ports used for sending data; the first row in the precoding matrix corresponds to the SRS port 0, and the second row in the precoding matrix corresponds to the SRS port 1; and the first row in the precoding matrix corresponds to the antenna port associated with the SRS port 0, and the second row in the precoding matrix corresponds to the antenna port associated with the SRS port 1.

For another example, when M=4, the second device configures four SRS ports 0 to 3 for the first device. It is assumed that when the first device sends the SRS, the four SRS ports are respectively associated with four antenna ports of the first device. The second device schedules, based on an SRS measurement result, the antenna ports corresponding to the two SRS ports 0 and 1 for the first device to send data. The second device indicates antenna port selection by using a port bitmap. For example, the port bitmap [1,1,0,0] indicates that antenna ports associated with the two SRS ports 0 and 1 are selected, and the two antenna ports are antenna ports used for sending data; the first row in the precoding matrix corresponds to the SRS port 0, and the second row in the precoding matrix corresponds to the SRS port 1; and the first row in the precoding matrix corresponds to the antenna port associated with the SRS port 0, and the second row in the precoding matrix corresponds to the antenna port associated with the SRS port 1.

In a possible implementation, the second indication information may include a port indication vector, the port indication vector is used to indicate two of the M ports, and an $i^{th}$ element in the port indication vector represents one of the M ports of the first reference signal corresponding to an $i^{th}$ row in the first precoding matrix.

For example, when M=4, the second device configures four SRS ports 0 to 3 for the first device. It is assumed that when the first device sends the SRS, the four SRS ports respectively correspond to four antenna ports of the first device. The second device schedules, based on an SRS measurement result, the antenna ports corresponding to two SRS ports 1 and 2 for the first device to send data. The second device indicates antenna port selection by using a port indication vector. For example the port indication vector $$\begin{bmatrix} 1 \\ 2 \end{bmatrix}$$

indicates that antenna ports associated with the two SRS ports 1 and 2 are selected, and the two antenna ports are antenna ports used for sending data; the first row in the precoding matrix corresponds to the SRS port 1, and the second row in the precoding matrix corresponds to the SRS port 2; and the first row in the precoding matrix corresponds to the antenna port associated with the SRS port 1, and the second row in the precoding matrix corresponds to the antenna port associated with the SRS port 2.

In a possible implementation, the second indication information may further include indication information of a second TPMI and/or indication information of a quantity of precoding layers, where the quantity of precoding layers is used to determine a target codebook, and the second TPMI is an index of the second precoding matrix in the target codebook. For example, when M=4, the second precoding matrix determined by the second device is $$\frac{1}{2}\begin{bmatrix} 1 & 1 \\ 1 & -1 \end{bmatrix},$$

and the quantity of precoding layers is 2, and it is determined, based on the codebook for layer 2 transmission using two ports in Table 2, that the index value of the second TPMI is 1.

Step 704: The second device sends second indication information to the first device.

For example, the second device may send, to the first device, information indicating the second TPMI, the quantity of precoding layers, and the port bitmap. For example, when M=4, the second precoding matrix is $$\frac{1}{2}\begin{bmatrix} 1 & 1 \\ 1 & -1 \end{bmatrix},$$

and two antenna ports associated with the SRS ports 0 and 1 are selected, the quantity of precoding layers is 2, the index value of the second TPMI is 1, and the port bitmap is [1,1,0,0].

For example, the second device may send the second TPMI, the quantity of precoding layers, and the port indication vector to the first device. For example, when M=4, the second precoding matrix is $$\frac{1}{2}\begin{bmatrix} 1 & 1 \\ 1 & -1 \end{bmatrix},$$

and two antenna ports associated with the SRS ports 1 and 2 are selected, the quantity of precoding layers is 2, the index value of the second TPMI is 1, and the port indication vector is $$\begin{bmatrix} 1 \\ 2 \end{bmatrix}.$$

Step 705: The first device receives the second indication information.

For example, the first device may receive the information indicating the second TPMI, the quantity of precoding layers, and the port bitmap, or receive the information indicating the second TPMI, the quantity of precoding layers, and the port indication vector. Further, the first device may search for the second precoding matrix based on the quantity of precoding layers and the second TPMI, and determine two of the M ports based on the port bitmap or the port indication vector.

For example, when M=4, the quantity of precoding layers in the second precoding matrix is 2, the index value of the second TPMI is 1, and the port indication vector is $$\begin{bmatrix} 1 \\ 2 \end{bmatrix}.$$

The first device determines, based on the quantity 2 precoding layers and the indication vector $$\begin{bmatrix} 1 \\ 2 \end{bmatrix},$$

that the precoding matrix table is a precoding matrix for layer 2 transmission using two antenna ports, that is, Table 2; determines, based on the index value 1 of the second TPMI, that the second precoding matrix is $$\frac{1}{2}\begin{bmatrix} 1 & 1 \\ 1 & -1 \end{bmatrix};$$

and determines, based on the port indication vector $$\begin{bmatrix} 1 \\ 2 \end{bmatrix},$$

that the first row in $$\frac{1}{2}\begin{bmatrix} 1 & 1 \\ 1 & -1 \end{bmatrix}$$

corresponds to the antenna port associated with the SRS port 1, and the second row corresponds to the antenna port associated with the SRS port 2.

For specific content of the steps in FIG. 7, refer to related descriptions in FIG. 5. Details are not described herein again.

In this embodiment of this application, when the quantity M of reference signal ports configured by the second device for the first device is greater than 2, the second device schedules, based on the reference signal measurement result, two antenna ports for the first device to send data, and performs TPMI indication by using a codebook corresponding to the quantity of antenna ports. In addition, an indication of "antenna port selection" is added, so that the TPMI-based indication method meets the requirement for transmit channel resource pooling, thereby ensuring a maximum degree of freedom of uplink transmit channel resource pooling, and improving uplink transmission performance.

Based on a same inventive concept as the foregoing communication method, an embodiment of this application further provides a communication apparatus.

Figure 8:
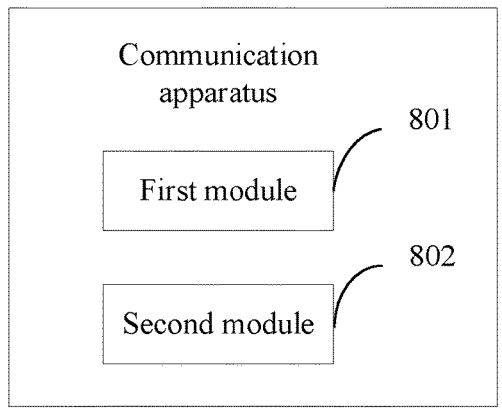
FIG. 8 is a diagram of a structure of a communication apparatus according to an embodiment of this application.

FIG. 8 is a diagram of a structure of a communication apparatus according to an embodiment of this application. As shown in FIG. 8, the apparatus may include a first module 801 and a second module 802.

In some embodiments, the first module 801 is configured to send a first reference signal of M ports, where M is an integer greater than 2; and the second module 802 is configured to receive first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

In a possible implementation, the partially coherent precoding matrix is a precoding matrix in which one column includes more than one and less than M non-zero elements, and the coherent precoding matrix is a precoding matrix in which all columns include M non-zero elements.

In a possible implementation, the first indication information includes indication information of a first TPMI, and the first TPMI is an index of the first precoding matrix in the target codebook.

In a possible implementation, when only two rows in the target precoding matrix include non-zero elements, the two rows in the target precoding matrix that include the non-zero elements are determined by [a, b; c, d], and a, b, c, and d are elements in $\{1/A_1, -1/A_1, j/A_1, -j/A_1\}$, where j is an imaginary unit, and $A_1$ is a positive constant.

In a possible implementation, when only two rows in the target precoding matrix include non-zero elements, the two rows in the target precoding matrix that include non-zero elements each may have any row location in the target precoding matrix, and a matrix formed by the two rows in the target precoding matrix that include non-zero elements is [a, b; c, d].

In a possible implementation, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, j is an imaginary unit, $A_2$ is a positive constant, and the three rows in the target precoding matrix that include the non-zero elements each may have any row location.

In a possible implementation, when only K rows in the target precoding matrix include non-zero elements, the non-zero elements are elements in $\{e^{jk\pi/K}/A_3\}$, where k=0, 1, 2, ..., K−1, j is an imaginary unit, $A_3$ is a positive constant, and the K rows in the target precoding matrix that include the non-zero elements each may have any row location.

In a possible implementation, when the quantity of columns in the target precoding matrix is greater than 1, any two columns in the target precoding matrix are orthogonal column vectors.

In a possible implementation, a waveform to which the target precoding matrix is applicable includes a DFT-s-OFDM waveform or a CP-OFDM waveform.

In this embodiment of this application, for an uplink enhancement solution of transmit channel resource pooling of the terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling and improving uplink transmission performance.

In some other embodiments, the first module 801 is configured to send a first reference signal of M ports, where M is an integer greater than 2; and the second module 802 is configured to receive second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

In a possible implementation, the target codebook includes at least one target precoding matrix, a quantity of rows in the target precoding matrix is N, and the target precoding matrix does not include a row in which all elements are 0.

In a possible implementation, the second indication information includes indication information of a second TPMI, and the second TPMI is an index of the second precoding matrix in the target codebook.

In a possible implementation, elements included in the target precoding matrix are elements in $\{e^{jn\pi/N}/A\}$, where n=0, 1, 2, ..., N−1, j is an imaginary unit, and A is a positive constant.

In a possible implementation, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port 0f the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

In a possible implementation, when the quantity of columns in the target precoding matrix is greater than 1, any two columns in the target precoding matrix are orthogonal column vectors.

In a possible implementation, a waveform to which the target precoding matrix is applicable includes a DFT-s-OFDM waveform or a CP-OFDM waveform.

In this embodiment of this application, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

Figure 9:
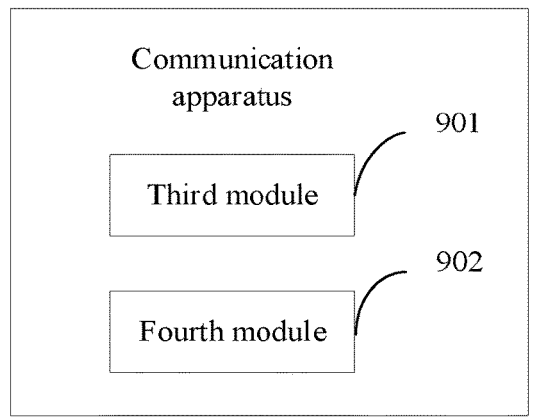
FIG. 9 is a diagram of a structure of a communication apparatus according to an embodiment of this application.

FIG. 9 is a diagram of a structure of a communication apparatus according to an embodiment of this application.

As shown in FIG. 9, the apparatus may include a third module 901 and a fourth module 902.

In some embodiments, the third module 901 is configured to: receive, by a second device, a first reference signal of M ports, where M is an integer greater than 2; and the fourth module 902 is configured to send first indication information, where the first indication information is used to indicate a first precoding matrix in a target codebook, the first precoding matrix is associated with the first reference signal, the target codebook includes at least one target precoding matrix, and a quantity of rows in the target precoding matrix is M; where the target precoding matrix has only two rows that include non-zero elements, the target precoding matrix has two columns, and the target precoding matrix is a partially coherent precoding matrix; or the target precoding matrix has only three rows that include non-zero elements, and the target precoding matrix is a partially coherent precoding matrix or a coherent precoding matrix; or the target precoding matrix has only K rows that include non-zero elements, K is an integer less than M and not less than 4, and the target precoding matrix is a partially coherent precoding matrix.

In a possible implementation, the partially coherent precoding matrix is a precoding matrix in which one column includes more than one and less than M non-zero elements, and the coherent precoding matrix is a precoding matrix in which all columns include M non-zero elements.

In a possible implementation, the first indication information includes indication information of a first TPMI, and the first TPMI is an index of the first precoding matrix in the target codebook.

In a possible implementation, when only two rows in the target precoding matrix include non-zero elements, the two rows in the target precoding matrix that include the non-zero elements are determined by [a, b; c, d], and a, b, c, and d are elements in $\{1/A_1, -1/A_1, j/A_1, -j/A_1\}$, where j is an imaginary unit, and $A_1$ is a positive constant.

In a possible implementation, the two rows in the target precoding matrix that include non-zero elements each may have any row location in the target precoding matrix, and a matrix formed by the two rows in the target precoding matrix that include non-zero elements is [a, b; c, d].

In a possible implementation, when only three rows in the target precoding matrix include non-zero elements, the non-zero elements are elements in $\{1/A_2, e^{j\pi/3}/A_2, e^{j2\pi/3}/A_2, -1/A_2, -e^{j2\pi/3}/A_2, -e^{j\pi/3}/A_2\}$, j is an imaginary unit, $A_2$ is a positive constant, and the three rows in the target precoding matrix that include the non-zero elements each may have any row location.

In a possible implementation, when only K rows in the target precoding matrix include non-zero elements, the non-zero elements are elements in $\{e^{jk\pi/K}/A_3\}$, where k=0, 1, 2, ..., K−1, j is an imaginary unit, $A_3$ is a positive constant, and the K rows in the target precoding matrix that include the non-zero elements each may have any row location.

In a possible implementation, when the quantity of columns in the target precoding matrix is greater than 1, any two columns in the target precoding matrix are orthogonal column vectors.

In a possible implementation, a waveform to which the target precoding matrix is applicable includes a DFT-s-OFDM waveform or a CP-OFDM waveform.

In this embodiment of this application, for an uplink enhancement solution of transmit channel resource pooling of the terminal device, a target codebook of M (M is an integer greater than 2) ports may be supported, and the first indication information is used to indicate a first precoding matrix in the target codebook of the M ports, so that a plurality of transmit channels can be selected from the M transmit channels for uplink transmission, thereby ensuring a maximum degree of freedom of uplink transmit channel resource pooling and improving uplink transmission performance.

In some other embodiments, the third module 901 is configured to receive a first reference signal of M ports, where M is an integer greater than 2; and the fourth module 902 is configured to send by the second device, second indication information, where the second indication information is used to indicate N of the M ports and a second precoding matrix in a target codebook, the second precoding matrix is associated with the N ports, a quantity of rows in the second precoding matrix is N, and N is a positive integer less than or equal to M.

In a possible implementation, the target codebook includes at least one target precoding matrix, a quantity of rows in the target precoding matrix is N, and the target precoding matrix does not include a row in which all elements are 0.

In a possible implementation, the second indication information includes indication information of a second TPMI, and the second TPMI is an index of the second precoding matrix in the target codebook.

In a possible implementation, elements included in the target precoding matrix are elements in $\{e^{jn\pi/N}/A\}$, where n=0, 1, 2, ..., N−1, j is an imaginary unit, and A is a positive constant.

In a possible implementation, the second indication information includes indication information of a port bitmap, and the port bitmap is used to indicate N of the M ports; when each bit in the port bitmap is 0, it indicates that a corresponding port of the M ports of the first reference signal is not used, and when each bit in the port bitmap is 1, it indicates that a corresponding port of the M ports of the first reference signal is used; or when each bit in the port bitmap is 1, it indicates that a corresponding port of the M ports of the first reference signal is not used, and when each bit in the port bitmap is 0, it indicates that a corresponding port 0f the M ports of the first reference signal is used; or the second indication information includes indication information of a port indication vector, the port indication vector is used to indicate N of the M ports, and an $i^{th}$ element in the port indication vector represents one of the M ports of the first reference signal corresponding to an $i^{th}$ row in the second precoding matrix.

In a possible implementation, when the quantity of columns in the target precoding matrix is greater than 1, any two columns in the target precoding matrix are orthogonal column vectors.

In a possible implementation, a waveform to which the target precoding matrix is applicable includes a DFT-s-OFDM waveform or a CP-OFDM waveform.

In this embodiment of this application, when the quantity M of reference signal ports configured by the second device for the first device is greater than N (M is an integer greater than 2), the second device schedules, based on a measurement result of the first reference signal, N antenna ports for the first device to send data, and performs precoding matrix indication by using a codebook corresponding to the quantity of antenna ports, and adds an indication of "antenna port selection", so that the precoding matrix indication method meets the requirement for transmit channel resource pooling, thereby ensuring a maximum degree of freedom of uplink transmit channel resource pooling, and improving uplink transmission performance.

For various possible implementations or descriptions of the foregoing embodiment, refer to the foregoing descriptions. Details are not described herein again.

An embodiment of this application further provides a communication system. The communication system includes the first device and the second device according to any one of the foregoing embodiments. The first device is configured to perform any one of the technical solutions shown in FIG. 2 to FIG. 7, and the second device is configured to perform any one of the technical solutions shown in FIG. 2 to FIG. 7.

Figure 10:
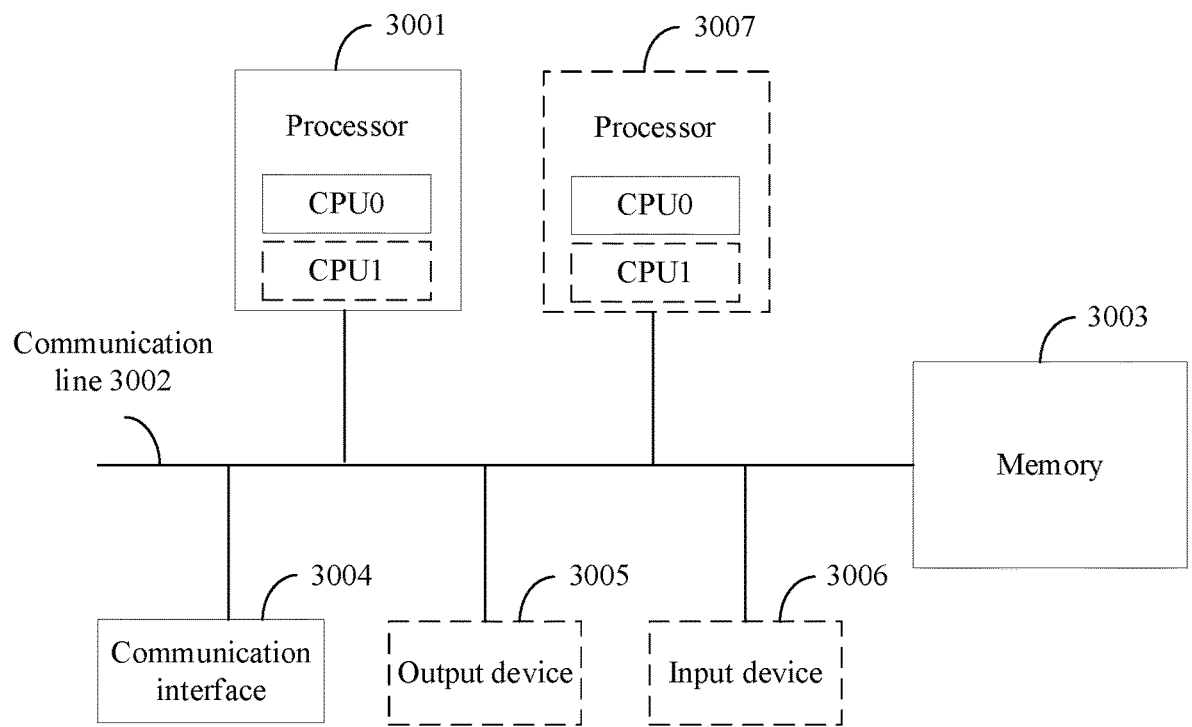
FIG. 10 is a schematic diagram of a structure of a terminal device according to an embodiment of this application.

FIG. 10 is a schematic diagram of a structure of a terminal device according to an embodiment of this application. As shown in FIG. 10, the communication apparatus may include at least one processor 3001, a communication line 3002, a memory 3003, and at least one communication interface 3004.

The processor 3001 may be a general-purpose central processing unit (CPU), a microprocessor, an application-specific integrated circuit (ASIC), or one or more integrated circuits for controlling program execution of the solutions of this application.

The communication line 3002 may include a path for transmitting information between the foregoing components.

The communication interface 3004 is any apparatus such as a transceiver, and configured to communicate with another device or communication network such as the Ethernet, a RAN, or a wireless local area network (WLAN).

The memory 3003 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), another compact disc storage, an optical disc storage (including a compact disc, a laser disc, an optical disc, a digital versatile disc, a Blu-ray disc, and the like), a magnetic disk storage medium, another magnetic storage device, or any other medium that can carry or store expected program code in a form of an instruction or a data structure and that can be accessed by a computer, but is not limited thereto. The memory may exist independently, and is connected to the processor through the communication line 3002. Alternatively, the memory may be integrated with the processor. Usually, the memory provided in this embodiment of this application may be a non-volatile memory. The memory 3003 is configured to store computer executable instructions for executing the solutions of this application, and the processor 3001 controls the execution. The processor 3001 is configured to execute the computer executable instructions stored in the memory 3003, to implement the methods provided in the foregoing embodiments of this application.

Optionally, the computer executable instructions in this embodiment of this application may also be referred to as application code. This is not specifically limited in this embodiment of this application.

During specific implementation, in an embodiment, the processor 3001 may include one or more CPUs such as a CPU0 and a CPU1 in FIG. 10.

During specific implementation, in an embodiment, the communication apparatus may include a plurality of processors such as the processor 3001 and a processor 3007 in FIG. 10. Each of these processors may be a single-core (single-CPU) processor or a multi-core (multi-CPU) processor. The processor herein may be one or more devices, circuits, and/or processing cores configured to process data (for example, computer program instructions).

During specific implementation, in an embodiment, the communication apparatus may further include an output device 3005 and an input device 3006. The output device 3005 communicates with the processor 3001, and may display information in a plurality of manners. For example, the output device 3005 may be a liquid crystal display (LCD), a light emitting diode (LED) display device, a cathode ray tube (CRT) display device, a projector (projector), or the like. The input device 3006 communicates with the processor 3001, and may receive an input of a user in a plurality of manners. For example, the input device 3006 may be a mouse, a keyboard, a touchscreen device, or a sensing device.

In an example, with reference to the communication apparatus shown in FIG. 10, the first module 801 in FIG. 8 may be implemented by the communication interface 3004 and/or the processor 3001 in FIG. 10, and the second module 802 in FIG. 8 may be implemented by the communication interface 3004 and/or the processor 3001 in FIG. 10. This is not limited in this embodiment of this application.

Figure 11:
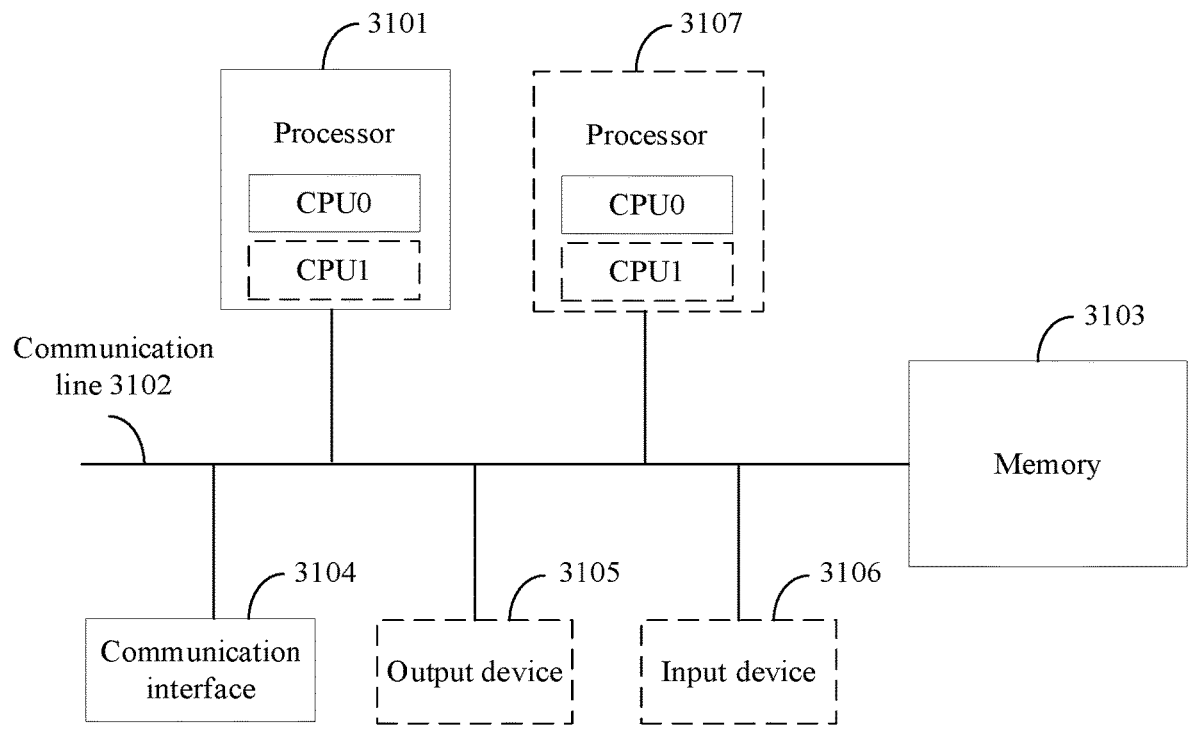
FIG. 11 is a schematic diagram of a structure of a network device according to an embodiment of this application.

FIG. 11 is a schematic diagram of a structure of a network device according to an embodiment of this application. As shown in FIG. 11, the communication apparatus may include at least one processor 3101, a communication line 3102, a memory 3103, and at least one communication interface 3104.

The processor 3101 may be a general-purpose central processing unit, a microprocessor, an application-specific integrated circuit, or one or more integrated circuits for controlling program execution of the solutions of this application.

The communication line 3102 may include a path for transmitting information between the foregoing components.

The communication interface 3104 is configured to communicate with another device or a communication network, such as Ethernet, a RAN, or a wireless local area network, by using any apparatus such as a transceiver.

The memory 3103 may be a read-only memory or another type of static storage device that can store static information and instructions; or a random access memory or another type of dynamic storage device that can store information and instructions. The memory may alternatively be an electrically erasable programmable read-only memory, a compact disc read-only memory or another compact disc storage, optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and that is accessible by a computer, but is not limited thereto. The memory may exist independently, and is connected to the processor through the communication line 3102. Alternatively, the memory may be integrated with the processor. Usually, the memory provided in this embodiment of this application may be a non-volatile memory. The memory 3103 is configured to store computer executable instructions for executing the solutions of this application, and the processor 3101 controls the execution. The processor 3101 is configured to execute the computer executable instructions stored in the memory 3103, to implement the methods provided in the foregoing embodiments of this application.

Optionally, the computer executable instructions in this embodiment of this application may also be referred to as application code. This is not specifically limited in this embodiment of this application.

During specific implementation, in an embodiment, the processor 3101 may include one or more CPUs such as a CPU0 and a CPU1 in FIG. 11.

During specific implementation, in an embodiment, the communication apparatus may include a plurality of processors such as the processor 3101 and a processor 3107 in FIG. 11. Each of the processors may be a single-core processor, or may be a multi-core processor. The processor herein may be one or more devices, circuits, and/or processing cores configured to process data (for example, computer program instructions).

During specific implementation, in an embodiment, the communication apparatus may further include an output device 3105 and an input device 3106. The output device 3105 communicates with the processor 3101, and may display information in a plurality of manners. For example, the output device 3105 may be a liquid crystal display, a light emitting diode display device, a cathode-ray tube display device, or a projector. The input device 3106 communicates with the processor 3101, and may receive an input of a user in a plurality of manners. For example, the input device 3106 may be a mouse, a keyboard, a touchscreen device, or a sensing device.

In an example, with reference to the communication apparatus shown in FIG. 11, the third module 901 in FIG. 9 may be implemented by the communication interface 3104 and/or the processor 3101 in FIG. 11, and the fourth module 9012 in FIG. 9 may be implemented by the communication interface 3104 and/or the processor 3101 in FIG. 11. This is not limited in this embodiment of this application.

Figure 12:
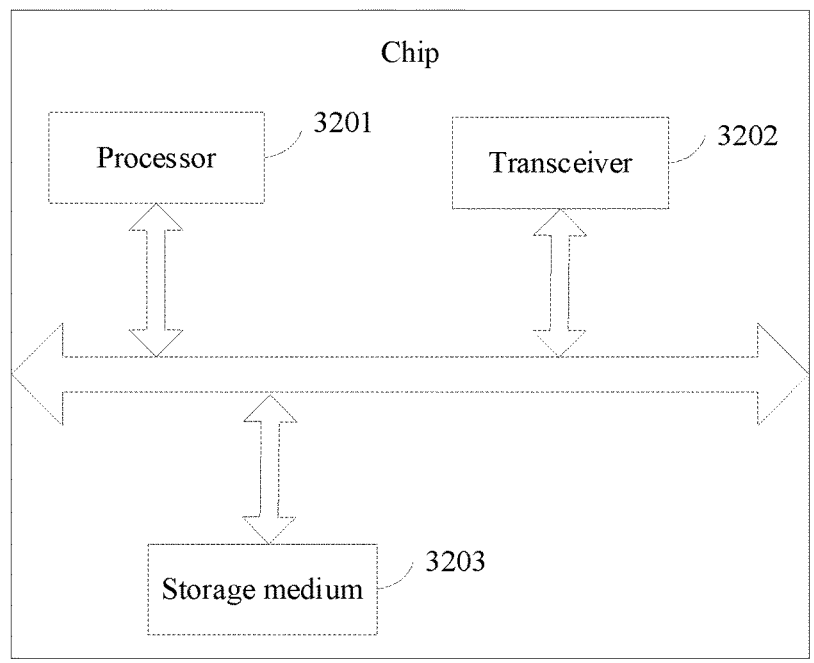
FIG. 12 is a schematic diagram of a structure of a chip according to an embodiment of this application.

FIG. 12 is a schematic diagram of a structure of a chip according to an embodiment of this application. As shown in FIG. 12, the chip shown in FIG. 12 may be a general-purpose processor, or may be a special-purpose processor. The chip includes a processor 3201. The processor 3201 is configured to support the communication apparatus in executing the technical solution shown in any one of FIG. 2 to FIG. 7.

Optionally, the chip further includes a transceiver 3202. The transceiver 3202 is configured to accept control of the processor 3201, and is configured to support the communication apparatus in executing the foregoing technical solutions. For example, the communication apparatus may perform the method shown in any one of FIG. 2 to FIG. 7.

Optionally, the chip shown in FIG. 12 may further include a storage medium 3203. For example, the codebooks in Table 1 to Table 13 may be stored in the storage medium 3203.

It should be noted that the chip shown in FIG. 12 may be implemented by using the following circuit or device: one or more field programmable gate arrays (FPGA), a programmable logic device (PLD), a controller, a state machine, gate logic, a discrete hardware component, any other appropriate circuit, or any combination of circuits that can perform various functions described in this application.

An embodiment of this application provides a non-volatile computer-readable storage medium, where the storage medium stores computer program instructions. When the computer program instructions are executed by a processor, the foregoing technical solution is implemented, for example, the method shown in any one of FIG. 2 to FIG. 7 may be performed.

An embodiment of this application provides a computer program product, including computer-readable code or a non-volatile computer-readable storage medium carrying computer-readable code. When the computer-readable code is run in a processor of an electronic device, the processor in the electronic device performs the foregoing technical solution, for example, the method shown in any one of FIG. 2 to FIG. 7 may be performed.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing.

The computer-readable program instructions described herein may be downloaded from the computer-readable storage medium to respective computing/processing devices or to an external computer or external storage device through a network such as the Internet, a local area network, a wide area network, and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of more than one of programming languages. The programming languages include an object-oriented programming language such as Smalltalk and C++, and a conventional procedural programming language such as a "C" language or a similar programming language. The computer-readable program instructions may be executed entirely on a user computer, partly on the user computer, as a stand-alone software package, partly on the user computer and partly on a remote computer, or entirely on the remote computer or a server. When a remote computer is used, the remote computer may be connected to a user computer through any type of network, including a local area network (LAN) or a wide area network (WAN), or may be connected to an external computer (for example, connected by using an Internet service provider through the Internet). In some embodiments, an electronic circuit, for example, a programmable logic circuit, a field programmable gate array (FPGA), or a programmable logic array (PLA), is customized by using status information of the computer-readable program instructions. The electronic circuit may execute the computer-readable program instructions, so as to implement the various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or the block diagrams.

The computer-readable program instructions may alternatively be loaded onto a computer, another programmable data processing apparatus, or another device, so that a series of operation steps is performed on the computer, the another programmable data processing apparatus, or the another device to produce a computer-implemented process. Therefore, the instructions executed on the computer, the another programmable data processing apparatus, or the another device implements the functions/actions specified in the one or more blocks in the flowcharts and/or block diagrams.

The flowcharts and block diagrams in the accompanying drawings show the system architecture, function, and operation of possible implementations of apparatuses, systems, methods, and computer program products according to various embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, a function marked in the block may also occur in a sequence different from that marked in the accompanying drawings. For example, two consecutive blocks may actually be executed substantially in parallel, and may sometimes be executed in a reverse order, depending on a used function.

It should also be noted that each block in the block diagram and/or the flowchart, and a combination of blocks in the block diagram and/or the flowchart may be implemented by hardware (for example, a circuit or an ASIC (Application Specific Integrated Circuit, application-specific integrated circuit)) that performs a corresponding function or action, or may be implemented by a combination of hardware and software, for example, firmware.

Although the present invention is described with reference to embodiments, in a process of implementing the present invention that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

The foregoing has described embodiments of this application. The foregoing descriptions are examples, not exhaustive, and are not limited to the disclosed embodiments. Many modifications and variations are apparent to a person of ordinary skill in the art without departing from the scope of the described embodiments. Selection of terms used in this specification is intended to best explain principles and actual application of embodiments, or improvements of embodiments to technologies in the market, or to enable another person of ordinary skill in the art to understand embodiments disclosed in this specification.

What is claimed is:

1. A communication method, wherein the method comprises:
sending, by a first device, a first reference signal of M ports, wherein M is an integer greater than 2; and
receiving, by the first device, first indication information, wherein the first indication information indicates a first precoding matrix in a target codebook, the first precoding matrix is associated with the first reference signal, the target codebook comprises at least one target precoding matrix, and a quantity of rows in the target precoding matrix is M, wherein non-zero elements of the target precoding matrix include elements in $$\left\{\frac{e^{\frac{jn\pi}{N}}}{A}\right\},$$

wherein n comprises integers 0 to N−1, N is a number of rows having the non-zero elements, j is an imaginary unit, A is a positive constant, and the target precoding matrix has only two rows that comprise non-zero elements, the target precoding matrix has two columns, N=2, and the target precoding matrix is a partially coherent precoding matrix, or the target precoding matrix has only three rows that comprise non-zero elements, N=3, and the target precoding matrix is a partially coherent precoding matrix or a coherent precoding matrix, or the target precoding matrix has only K rows that comprise non-zero elements, N=K, K is an integer less than M and not less than 4, and the target precoding matrix is a partially coherent precoding matrix.

2. The method according to claim 1, wherein:
the partially coherent precoding matrix is a precoding matrix in which one column comprises more than one and less than M non-zero elements; and
the coherent precoding matrix is a precoding matrix in which all columns comprise M non-zero elements.

3. The method of claim 1, wherein:
the first indication information comprises indication information of a first transmit precoding matrix indicator (TPMI); and
the first TPMI is an index of the first precoding matrix in the target codebook.

4. The method of claim 1, wherein:
when only two rows in the target precoding matrix comprise non-zero elements, the two rows in the target precoding matrix that comprise the non-zero elements are set to $$\begin{bmatrix} a & b \\ c & d \end{bmatrix},$$

a, b, c, and d are elements in $\{1/A_1, -1/A_1, j/A_1, -j/A_1\}$;
j is an imaginary unit; and
$A_1$=A is the positive constant.

5. The method of claim 4, wherein the two rows in the target precoding matrix that comprise non-zero elements each may have any row location in the target precoding matrix, and a matrix formed by the two rows in the target precoding matrix that comprise non-zero elements is $$\begin{bmatrix} a & b \\ c & d \end{bmatrix}.$$

6. The method of claim 1, wherein when only three rows in the target precoding matrix comprise non-zero elements, the non-zero elements are elements in $$\left\{ \frac{1}{A_2}, \frac{e^{\frac{j\pi}{3}}}{A_2}, \frac{e^{\frac{j2\pi}{3}}}{A_2}, -\frac{1}{A_2}, -\frac{e^{\frac{j2\pi}{3}}}{A_2}, \frac{-e^{\frac{j\pi}{3}}}{A_2} \right\},$$

wherein j is an imaginary unit, $A_2=A$ is the positive constant, and the three rows in the target precoding matrix that comprise the non-zero elements each may have any row location.

7. The method of claim 1, wherein when only K rows in the target precoding matrix comprise non-zero elements, the non-zero elements are elements in $$\left\{ \frac{e^{\frac{jk\pi}{K}}}{A_3} \right\},$$

wherein k=0, 1, 2, . . . , K−1, j is an imaginary unit, $A_3=A$ is the positive constant, and the K rows in the target precoding matrix that comprise the non-zero elements each may have any row location.

8. The method of claim 1, wherein, when a quantity of columns in the target precoding matrix is greater than 1, any two columns in the target precoding matrix are orthogonal column vectors.

9. The method of claim 1, wherein a waveform to which the target precoding matrix is applicable comprises a discrete Fourier transformation spread orthogonal frequency division multiplexing DFT-s-OFDM waveform or a cyclic prefix orthogonal frequency division multiplexing CP-OFDM waveform.

10. A communication method, comprising:
receiving, by a second device, a first reference signal of M ports, wherein M is an integer greater than 2; and
sending, by the second device, first indication information, wherein the first indication information indicates a first precoding matrix in a target codebook, the first precoding matrix is associated with the first reference signal, the target codebook comprises at least one target precoding matrix, and a quantity of rows in the target precoding matrix is M, wherein non-zero elements of the target precoding matrix include elements in $$\left\{ \frac{e^{\frac{jn\pi}{N}}}{A} \right\},$$

wherein n comprises integers 0 to N−1, N is a number of rows having the non-zero elements, j is an imaginary unit, A is a positive constant, and the target precoding matrix has only two rows that comprise non-zero elements, N=2, the target precoding matrix has two columns, and the target precoding matrix is a partially coherent precoding matrix; or the target precoding matrix has only three rows that comprise non-zero elements, N=3, and the target precoding matrix is a partially coherent precoding matrix or a coherent precoding matrix; or the target precoding matrix has only K rows that comprise non-zero elements, N=K, K is an integer less than M and not less than 4, and the target precoding matrix is a partially coherent precoding matrix.

11. The method of claim 10, wherein:
the partially coherent precoding matrix is a precoding matrix in which one column comprises more than one and less than M non-zero elements; and
the coherent precoding matrix is a precoding matrix in which all columns comprise M non-zero elements.

12. The method of claim 10, wherein the first indication information comprises indication information of a first transmit precoding matrix indicator (TPMI), and the first TPMI is an index of the first precoding matrix in the target codebook.

13. A non-transitory computer-readable storage medium with a computer program code stored thereon, wherein the computer program code comprises instructions that, when run on a first device, the first device is enabled to perform:
sending a first reference signal of M ports, wherein M is an integer greater than 2; and
receiving first indication information, wherein the first indication information indicates a first precoding matrix in a target codebook, the first precoding matrix is associated with the first reference signal, the target codebook comprises at least one target precoding matrix, and a quantity of rows in the target precoding matrix is M, wherein non-zero elements of the target precoding matrix include elements in $$\left\{ \frac{e^{\frac{jn\pi}{N}}}{A} \right\},$$

wherein n comprises integers 0 to N−1, N is a number of rows having the non-zero elements, j is an imaginary unit, A is a positive constant, and the target precoding matrix has only two rows that comprise non-zero elements, N=2, the target precoding matrix has two columns, and the target precoding matrix is a partially coherent precoding matrix, or the target precoding matrix has only three rows that comprise non-zero elements, N=3, and the target precoding matrix is a partially coherent precoding matrix or a coherent precoding matrix, or the target precoding matrix has only K rows that comprise non-zero elements, N=K, K is an integer less than M and not less than 4, and the target precoding matrix is a partially coherent precoding matrix.

14. The non-transitory computer-readable storage medium of claim 13, wherein:
the partially coherent precoding matrix is a precoding matrix in which one column comprises more than one and less than M non-zero elements; and
the coherent precoding matrix is a precoding matrix in which all columns comprise M non-zero elements.

15. The non-transitory computer-readable storage medium of claim 13, wherein the first indication information comprises indication information of a first transmit precoding matrix indicator (TPMI), and the first TPMI is an index of the first precoding matrix in the target codebook.

16. The non-transitory computer-readable storage medium of claim 13, wherein:
when only two rows in the target precoding matrix comprise non-zero elements, the two rows in the target precoding matrix that comprise the non-zero elements are set to $$\begin{bmatrix} a & b \\ c & d \end{bmatrix};$$

a, b, c, and d are elements in $\{1/A_1, -1/A_1, j/A_1, -j/A_1\}$;
j is an imaginary unit; and
$A_1 = A$ is the positive constant.

17. The non-transitory computer-readable storage medium of claim 16, wherein the two rows in the target precoding matrix that comprise non-zero elements each may have any row location in the target precoding matrix, and a matrix formed by the two rows in the target precoding matrix that comprise non-zero elements is $$\begin{bmatrix} a & b \\ c & d \end{bmatrix}.$$

18. The non-transitory computer-readable storage medium of claim 13, wherein when only three rows in the target precoding matrix comprise non-zero elements, the non-zero elements are elements in $$\left\{ \frac{1}{A_2}, \frac{e^{\frac{j\pi}{3}}}{A_2}, \frac{e^{\frac{j2\pi}{3}}}{A_2}, -\frac{1}{A_2}, -\frac{e^{\frac{j2\pi}{3}}}{A_2}, \frac{-e^{\frac{j\pi}{3}}}{A_2} \right\},$$

wherein j is an imaginary unit, $A_2 = A$ is the positive constant, and the three rows in the target precoding matrix that comprise the non-zero elements each may have any row location.

19. The non-transitory computer-readable storage medium of claim 13, wherein when only K rows in the target precoding matrix comprise non-zero elements, the non-zero elements are elements in $$\left\{ \frac{e^{\frac{jk\pi}{K}}}{A_3} \right\},$$

wherein k=0, 1, 2, ..., K−1, j is an imaginary unit, $A_3 = A$ is the positive constant, and the K rows in the target precoding matrix that comprise the non-zero elements each may have any row location.

20. The non-transitory computer-readable storage medium of claim 13, wherein when a quantity of columns in the target precoding matrix is greater than 1, any two columns in the target precoding matrix are orthogonal column vectors.

* * * * *